US 6,459,502 B1

(12) United States Patent
Takamatsu et al.

(10) Patent No.: US 6,459,502 B1
(45) Date of Patent: Oct. 1, 2002

(54) IMAGE FORMATION DEVICE AND IMAGE PROCESSING DEVICE

(75) Inventors: Masahiro Takamatsu; Kazuto Hayashi; Masahiko Kubo; Koichiro Shinohara; Kazuhiro Iwaoka, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/388,932

(22) Filed: Sep. 2, 1999

(30) Foreign Application Priority Data

Oct. 16, 1998 (JP) .......................................... 10-295041

(51) Int. Cl.$^7$ ........................... H04N 1/46; G06K 15/00
(52) U.S. Cl. ........................................ 358/1.9; 358/534
(58) Field of Search ................................ 358/1.9, 1.16, 358/534, 429

(56) References Cited

U.S. PATENT DOCUMENTS

| 5,754,709 A | * | 5/1998 | Moriya | 382/274 |
| 5,818,970 A | * | 10/1998 | Ishikawa | 382/248 |
| 2002/0001096 A1 | * | 1/2002 | Hama | 358/1.9 |

FOREIGN PATENT DOCUMENTS

| JP | 363205238 | * | 8/1988 | ............. B41J/3/00 |
| JP | 5-281790 | | 10/1993 | |
| JP | 6-60181 | | 3/1994 | |
| JP | 6-87234 | | 3/1994 | |
| JP | 8-23455 | | 1/1996 | |
| JP | 8-228298 | | 9/1996 | |
| JP | 8-337007 | | 12/1996 | |
| JP | 8-339441 | | 12/1996 | |
| JP | 10-65917 | | 3/1998 | |
| JP | 10-65918 | | 3/1998 | |
| JP | 10-65919 | | 3/1998 | |
| JP | 10-65920 | | 3/1998 | |
| JP | 11-32214 | | 2/1999 | |
| JP | 11103391 | * | 4/1999 | .......... H04N/1/407 |
| JP | 02001197305 | * | 7/2001 | ............ H04N/1/40 |

* cited by examiner

Primary Examiner—Jerome Grant, II
(74) Attorney, Agent, or Firm—Morgan, Lewis & Bockius LLP

(57) ABSTRACT

The invention provides an image formation device based on the electrophotographic system, whereby, when an outputted image varies from the halftone area to the background area in the sub-scanning direction, the density reduction of a rear end area of the halftone area that borders on the background area can be prevented, by means of simplified and small-scale processing. In this image formation device, a backward edge of the halftone area that borders on the background area is extracted, and an image data value of the background area including m pixels after this backward edge in the sub-scanning direction, of input image data Si, is modified to a setting value with correction data. The setting value is set to a value slightly lower than the threshold value corresponding to the dot area coverage of an image recurrence start point. If there is a halftone area whose image data value given by input image data Sib is greater than the threshold value, or a background area whose image data value is greater than the setting value, in an area including m pixels in the sub-scanning direction after the backward edge of the halftone area given by input image data Sia, the value of the image data with regard to that area will not be modified, and only the value of the image data with regard to the area from the backward edge of the halftone area to that area will be modified to the setting value.

18 Claims, 20 Drawing Sheets

IMAGE FORMATION DEVICE AND IMAGE PROCESSING DEVICE

BACKGROUND OF THE INVENTION

1. Field of the Invention

The present invention relates to an image formation device such as a digital copying machine, computer printer, or network printer, and an image processing device for such an image formation device.

2. Description of the Related Art

In most of the image formation devices currently available on the market, such as a digital copying machine, computer printer, or network printer, the electrophotographic system that allows acquisition of a high quality image with a high speed is widely adopted as an image output device.

In the electrophotographic system, the insulated toner and magnetic particles are mixed and rubbed in a developing roller to thereby electrify the insulated toner, the developing agent is formed in a brush on the developing roller by the magnetic force, and the developing agent is supplied onto the photosensitive structure by the rotation of the developing roller, whereby the static latent image is developed on the photosensitive structure. This method is called the two-component magnetic brush developing system, which is widely used in various fields and widely adopted especially in the color image formation device.

However, in the image output unit of this electrophotographic system, specially in the image output unit based on the two-component magnetic brush developing system, the density of the rear end area of the halftone area which borders on the background area decreases due to a non-linear and asymmetric output characteristic of the image output unit, when an outputted image varies from the halftone area to the background area in the sub-scanning direction.

That is, as shown in FIG. 21A, when the o utputted image varies from a halftone area 1 to a background area 2 in the sub-scanning direction being the reverse direction to the paper feeding direction, which is perpendicular to the main scanning direction of the laser beam for forming the static latent image on the photosensitive structure, the density of a rear end area 1B of the halftone area 1 which borders on the background area 2 decreases on the reasons as shown hereunder.

As shown in FIG. 22, in the electrophotographic system using the two-component magnetic brush developing system, during the rotation of a photosensitive drum 310 along the direction of an arrow 311, an electrifier 320 for forming the static latent image electrifies the photosensitive drum 310, and the laser beam L modulated by an image signal irradiates the electrified photosensitive drum 310, whereby the photosensitive drum 310 forms the static latent image thereon. The photosensitive drum 310 having the static latent image formed thereon comes in contact with a developing agent layer 337 on the surface of a developing sleeve 335 that rotates in the direction of an arrow 336 at about twice the linear velocity against that of the photosensitive drum 310. Thereby, the toner in the developing agent layer 337 is affixed to a latent image portion on the photosensitive drum 310, thereby developing the static latent image on the photosensitive drum 310 into the toner image.

FIG. 22A illustrates a state at the moment when the irradiation of the laser beam L forms a latent image portion 3 corresponding to the halftone area 1 on the photosensitive drum 310, and a forward edge 3f of the latent image portion 3 comes in contract with the developing agent layer 337. FIG. 22B illustrates a state at the moment when a part slightly before a backward edge 3b of the latent image portion 3 comes in contract with the developing agent layer 337. FIG. 22C illustrates a state at the moment when the backward edge 3b of the latent image portion 3 comes in contract with the developing agent layer 337.

The developing sleeve 335 is given the developing bias of, for example, −500 V. The photosensitive drum 310 is electrified at the potential of, for example, −650 V by the electrifier 320. The latent image portion 3 corresponding to the halftone area 1 is electrified at, for example, −200 V which is lower than the developing bias potential. The electrified potential of a part 4 corresponding to the background area 2 at the back of the halftone area 1 becomes −650 V which is higher than the developing bias.

As shown in FIG. 22A, when the forward edge 3f of the latent image portion 3 comes in contact with the developing agent layer 337, a forward electric field for the developing bias is applied to toner tq lying at a position Q where the photosensitive drum 310 comes in contact with the developing agent layer 337. The toner tq is pulled toward the surface of the developing agent layer 337, and is affixed on the latent image portion 3. However, as shown in FIG. 22B, when the part 4 corresponding to the background area 2 at the back of the halftone area 1 comes close to the developing agent layer 337, toner tb lying at a part of the developing agent layer 337 which faces the part 4 is driven away from the surface of the developing agent layer 337, and dives deep into the developing agent layer 337.

While the developing sleeve 335 rotates in the direction of the arrow 336, the toner tb approaches to the position Q where the photosensitive drum 310 comes in contact with the developing agent layer 337, and moves toward the surface of the developing agent layer 337 due to the lower potential of the latent image portion 3. However in this movement, there occurs a time delay for the toner to reach the surface of the developing agent layer 337. Therefore, as shown in FIG. 22B, the amount of the toner affixed on the photosensitive drum 310 decreases from the moment when the part slightly before the backward edge 3b of the latent image portion 3 comes in contract with the developing agent layer 337, and as mentioned above decreases the density of the rear end area 1B of the halftone area 1 which borders on the background area 2.

When the front of the halftone area 1 is also a background area and the forward edge 3f of the latent image portion 3 also comes in contact with the developing agent layer 337, as shown by toner tf in FIG. 22A, some toner is driven away from the surface of the developing agent layer 337 by a part 5 on the photosensitive drum 310 corresponding to the front of the background area.

However, accompanied with the rotation of the developing sleeve 335 in the direction of the arrow 336, the toner tf quickly moves away from the position Q where the photosensitive drum 310 comes in contact with the developing agent layer 337. And at the same time, the toner tq pulled close to the surface of the developing agent layer 337 by the lower potential of the latent image portion 3 approaches the position Q immediately, and is affixed on the latent image portion 3. Therefore, if the outputted image varies from the background area to the halftone area 1 in reverse to the sub-scanning direction, the density of the front end area of the halftone area 1 which borders on the background area does not decrease.

Thus, in the electrophotographic system using the two-component magnetic brush developing system, when the outputted image varies from the halftone area 1 to the background area 2 in the sub-scanning direction, the density of the rear end area 1B of the halftone area 1 which borders on the background area 2 decreases due to the partial reduction from the average of the toner density on the surface of the developing agent layer 337 overlying the developing sleeve 335. In this specification, this density reduction is called TED (Trail Edge Deletion).

This TED can be reduced to some extent by approximating the linear velocity of the developing sleeve 335 to that of the photosensitive drum 310. However, even if the linear velocity of the developing sleeve 335 is made equal to that of the photosensitive drum 310, it is difficult to completely annul TED and develop the toner with ample quantity.

Accordingly, in the Japanese Published Unexamined Patent Application No. Hei 5-281790 and No. Hei 6-87234, there is disclosed a concept that prevents the density reduction as the foregoing TED by enhancing the accuracy of the laser beam scanner that writes a static latent image on a photosensitive structure by a laser beam, and by adjusting the parameters of the developing part that develops the static latent image to thereby enhance the contrast of the developing electric field.

However, the method of enhancing the contrast of the developing electric field by enhancing the accuracy of the laser beam scanner being a part that writes a static latent image tends to invite the size expansion and cost increase of the image output unit. Moreover, if the screen line number is increased for a higher resolution of an output image by the image output unit, the contrast of the developing electric field is lowered, and the density reduction as TED is likely to occur, which makes it difficult to achieve both the elimination of the density reduction and the enhancement of the resolution of the output image.

In recent years, accompanied with the widespread of computer printers and network printers, opportunities are increasing for printing graphic images created on a host computer such as a personal computer and the like. In such graphic images, the density reduction as TED is more obvious than natural images such as photographs. Therefore, in the image formation device such as the computer printer and the network printer, etc., the density reduction as TED develops into a greater problem than in the image formation device of the copying machine, etc.

As a method for correcting a linear and symmetrical output characteristic of an image output unit, such as the MTF characteristic, the system that corrects input image data by the digital filtering processing is widely accepted. However, since there is a narrow domain for the digital filtering processing, it is impossible to decrease or prevent the density reduction as TED that occurs over a wide range in the sub-scanning direction based on a nonlinear and asymmetrical output characteristic of an image output unit as mentioned above.

Accordingly, the applicant disclosed a proposal to prevent the density reduction as TED by correcting image data in the Japanese Published Unexamined Patent Application No. Hei 10-65917.

Since it corrects image data value of a halftone area linearly on the basis of the image data value of an edge in which an outputted image varies from the halftone area to the background area in the sub-scanning direction, this method makes it possible to easily achieve enhancement of the resolution of the output image without inviting the size expansion and cost increase of the device, and to prevent the density reduction as TED.

Further, in the Japanese Published Unexamined Patent Application No. Hei 10-65920, the applicant proposed to enhance the correction accuracy of TED by describing the characteristic of a density variation into a characteristic description part, and correcting the described characteristic on the basis of the outputted image in the image output unit. Furthermore, in the Japanese Published Unexamined Patent Application No. Hei 11-32214, the applicant proposed to enhance the correction accuracy of TED with the image data value after the edge taken into consideration.

However in the methods of these applications, since the correction value for the image data of the halftone area is calculated on the basis of the image data value at the edge and after the edge, and further in accordance with the position from the edge, the correction processing will become considerably large in scale.

SUMMARY OF THE INVENTION

Accordingly, it is an object of the present invention to prevent the density reduction in the rear end area of the halftone area which borders on the background area, when the outputted image varies from the halftone area to the background area in the sub-scanning direction, by simplified and small-scale processing without inviting the size enlargement and cost increase of the image formation device or the image output device.

In order to accomplish the object of the present invention, the image formation device that forms a color image on a recording medium is comprised of an edge extraction part that extracts an edge in which multivalued image data of each recorded color varies from halftone image data to background image data in the sub-scanning direction on the recording medium, and an image data correction part that modifies a value of the background image data close to the edge extracted by the edge extraction part, of the multivalued image data, to a setting value close to an image recurrence start point of the image formation device.

In this case, the value of the background image data in a range having specific m pixels in the sub-scanning direction from the edge, or in a range having specific m pixels in the sub-scanning direction from the edge and specific n pixels in the main scanning direction, or in a range having specific m pixels in the sub-scanning direction with the edge on the center and specific n pixels in the main scanning direction can be modified to the setting value. Further in this case, the setting value can be made to be designated by a user.

In the image formation device of the present invention thus configured, the value of the background image data close to an edge in which the multivalued image data varies from the halftone image data to the background image data in the subscanning direction is modified to the setting value, namely, a value close to an image recurrence start point of the image formation device. Therefore, as shown in FIG. 21A, when the outputted image varies from the halftone area 1 to the background area 2 in the sub-scanning direction, a latent image is formed to a non-developing degree on the part 4 corresponding to the background area 2 on the photosensitive drum 310 shown in FIG. 22, and the potential of the part 4 approximates to the developing bias potential applied to the developing sleeve 335.

Accordingly, the reverse electric field applied to the toner contained in the developing agent layer 337 becomes extremely weak, and the toner contained in the developing agent layer 337 will not be driven away from the surface of the developing agent layer 337. Accordingly, when the rear end part of the latent image portion 3 on the photosensitive drum 310, corresponding to the rear end area of the halftone area 1 that borders on the background area 2, comes in contact with the developing agent layer 337, the toner is affixed on the latent image portion 3 of the photosensitive drum 310 without a time delay, by the forward developing electric field due to the lower potential of the latent image portion 3.

Therefore, the density reduction of the rear end area of the halftone area 1 that borders on the background area 2 can be prevented. And in the present invention, to prevent the density reduction is only needed to replace the value of the background image data close to the edge by the setting value, for which suffices simplified and small-scale processing.

Similarly, in the image formation devices of the present invention as claimed in claims 2, 3, 4, 7, 8, or in the image processing devices of the present invention as claimed in claims 9, 10, 11, 12, 13, 16, 17, 18, the modification of the value of the background image data close to the edge, or all the values of the background image data to the setting value makes it possible to prevent the density reduction of the rear end area of the halftone area that borders on the background area.

DESCRIPTION OF THE PREFERRED EMBODIMENTS

[Embodiment 1 FIG. 1 through FIG. 3, FIG. 9 through FIG. 11]

Figure 1:
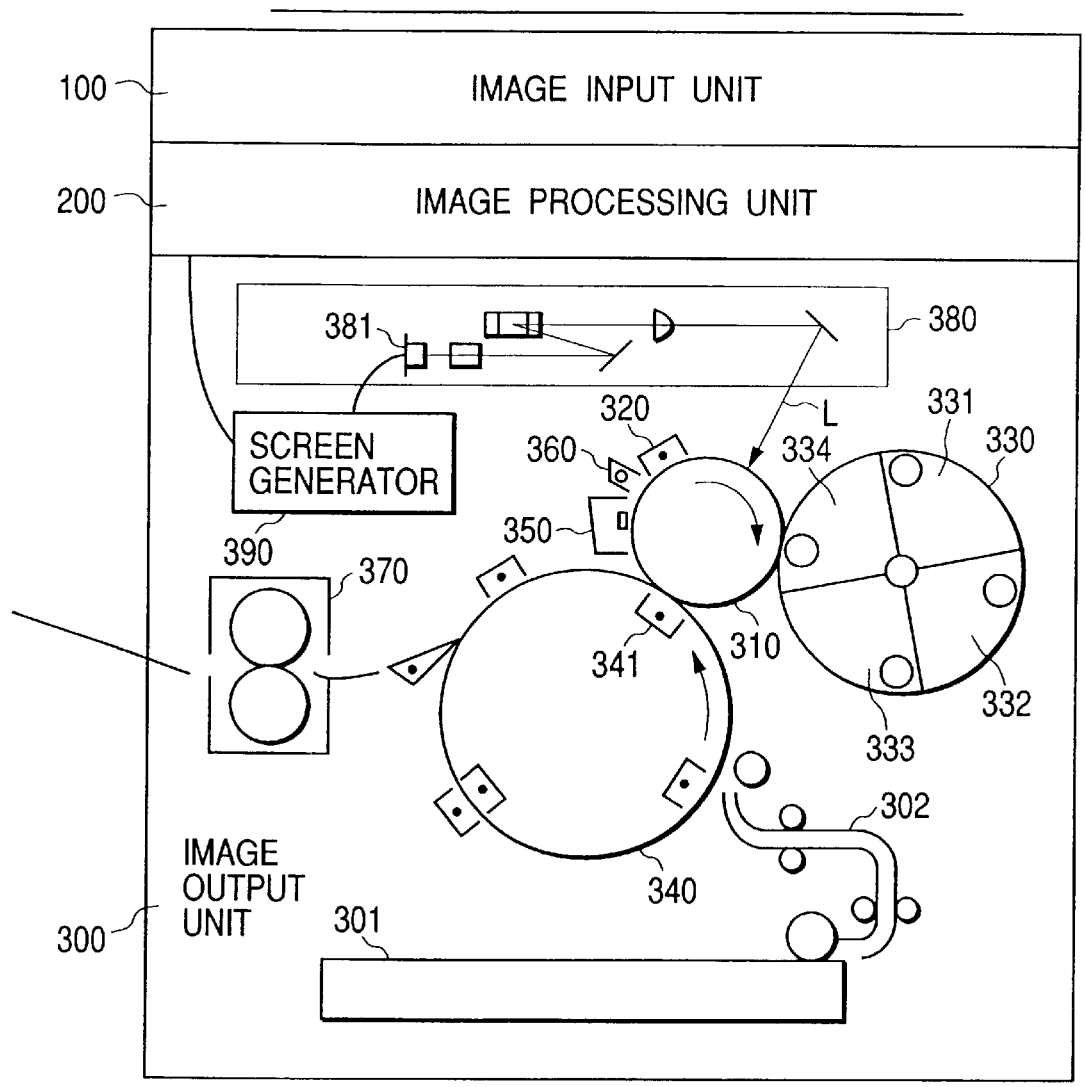
FIG. 1 is a chart to illustrate the total construction of a digital color copying machine as an example of an image formation device of the present invention.

FIG. 1 illustrates the total construction of a digital color copying machine as an image formation device of the present invention, which is incorporated into an image processing device of the present invention.

This image formation device, namely, the copying machine comprises an image input unit 100, an image processing unit 200, and an image output unit 300. The image input unit 100 reads the images on a copy by a scanner made up with a CCD sensor, etc., with the resolution of, for example, 16 pixels/mm (400 pixels/inch), and outputs the input image signal that is formed of digital data having 8 bits, 256 gradations for each colors of the Red (R), the Green (G), and the Blue (B).

The image processing unit 200 is one example of the image processing device of the present invention. Receiving the input image signal from the image input unit 100, the image processing unit 200 forms the image record signal formed of digital data having 8 bits, 256 gradations for each colors of Yellow (Y), Magenta (M), Cyan (C), Black (K), which are served as the record colors in the image output unit 300, and also corrects the image data value of the image record signal, which will be described later.

Figure 2:
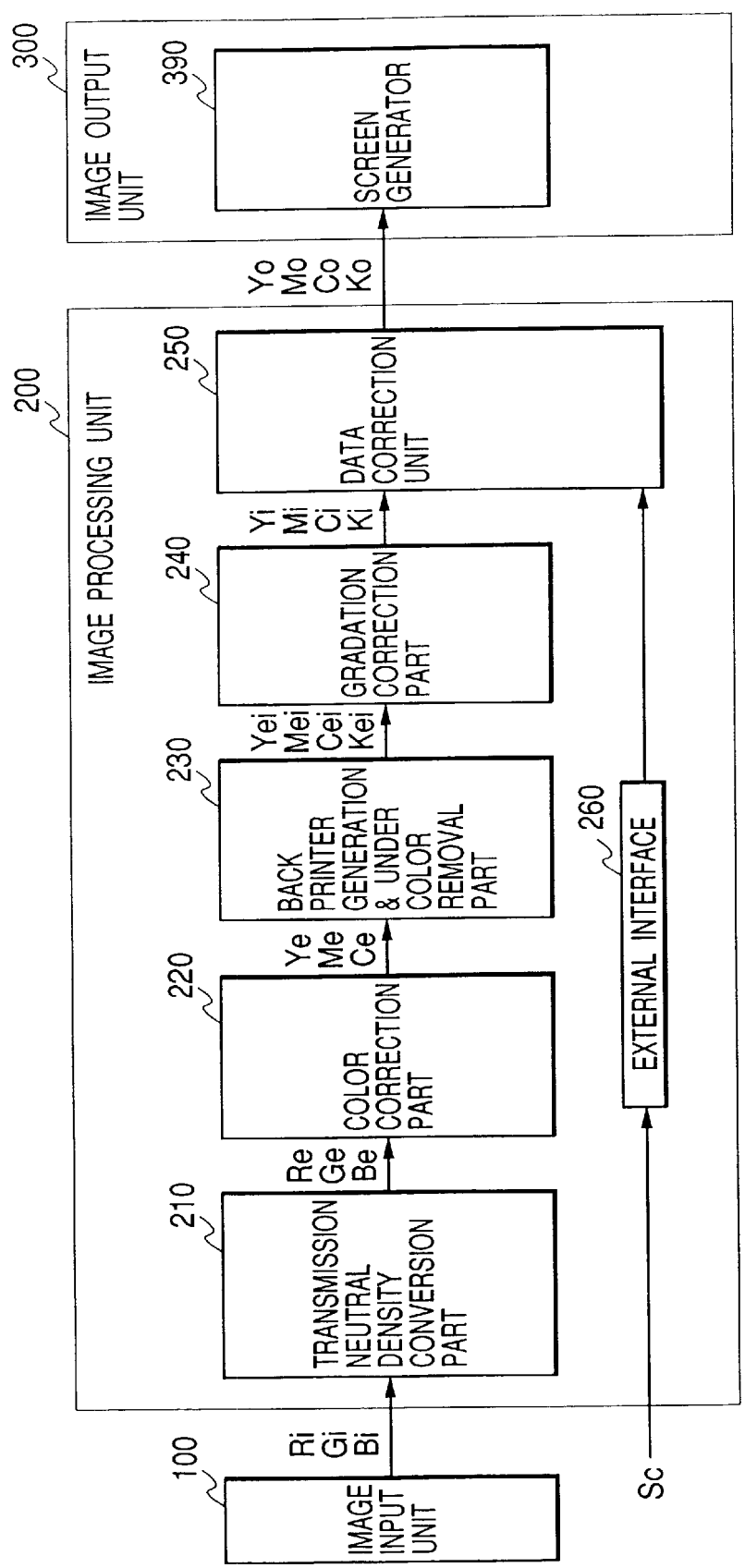
FIG. 2 is a chart to illustrate a first example of an image processing unit of the copying machine in FIG. 1.

FIG. 2 illustrates a first example of the image processing unit 200. In this unit, the signals Ri, Gi, Bi of the RGB three colors incoming from the image input unit 100 are converted into the signals Re, Ge, Be of the transmission neutral density by a transmission neutral density conversion part 210. The signals Re, Ge, Be of the transmission neutral density are converted into the signals Ye, Me, Ce of YMC three colors of the transmission neutral density by a color correction part 220. The signals Ye, Me, Ce of the transmission neutral density are converted into the signals Yei, Mei, Cei of YMC three colors with the under color removed and the Black signal Kei by a black printer generation & under color removal part 230. The signals Yei, Mei, Cei, Kei are corrected in gradation and converted into the image signals Yi, Mi, Ci, Ki of the YMCK four colors by a gradation correction part 240.

The signals Yi, Mi, Ci, Ki are supplied to a data correction unit 250 as the input image data, whose image data is corrected, as described later. Further, in this example, a color signal Sc incoming from an external device such as a computer is accepted by the image processing unit 200 through an external interface 260, and is supplied to the data correction unit 250, whose image data is corrected in the same manner as the signals Yi, Mi, Ci, Ki.

The signals Yo, Mo, Co, Ko of the YMCK four colors, whose image data is corrected by the data correction unit 250, are supplied to the image output unit 300 as the output image data from the image processing unit 200.

As the transmission neutral density conversion part 210 and the gradation correction part 240, for example, onedimensional lookup table is used. As the color correction part 220, the linear masking method by the generally used matrix operation of 3×3 can be used, but the nonlinear masking methods of 3×6, 3×9, etc., may be used alternatively. As the black printer generation & under color removal part 230, the generally used skeleton UCR system can be used. However, any other well-known method may be used for these parts.

The image output unit 300 is based on the two-component magnetic brush developing system of the electrophotography. As shown in FIG. 1 and FIG. 2, the image output unit 300 includes a screen generator 390, whereby the output image data from the image processing unit 200 is converted into a screen signal, namely, a binary signal in which the pulse width of the image data is modulated in accordance with the image data value.

As shown in FIG. 1, in the image output unit 300, a laser diode 381 of a laser beam scanner 380 is driven by the screen signal from the screen generator 390. The laser diode 381 of the laser beam scanner 380 emits a laser beam L, which irradiates a photosensitive drum 310.

The photosensitive drum 310 is electrified by an electrifier 320 for forming the static latent image, which is irradiated by the laser beam L from the laser beam scanner 380, whereby the photosensitive drum 310 forms the static latent image thereon.

A developing roller 330 containing four developing counters 331, 332, 333, 334 for the four colors of KYMC comes in contact with the photosensitive drum 310 having the static latent image formed. Thereby, the static latent image of each color formed on the photosensitive drum 310 is developed into a toner image.

And, a sheet of paper on a paper tray 301 is fed onto a transfer drum 340 by a paper feeder 302, and is wound around on the drum, to which a corona discharge is applied from the back of the sheet by a transfer electrifier 341. Thereby, the toner image developed on the photosensitive drum 310 is transferred onto the sheet. In case of the output image being a multicolor image, the sheet is brought into contact with the photosensitive drum 310 for two to four times repeatedly, whereby the multicolor image with four colors of KYMC is transferred to the sheet.

The sheet after transfer is fed to a fixing device 370, where the toner image is fixed on the sheet by being heated and melted. After the toner image is transferred to the sheet, the photosensitive drum 310 is cleaned by a cleaner 350, and a pre-exposure device 360 makes a preparation for reuse of the drum.

Concretely in this example, the laser beam L whose diameters in the main scanning direction and the subscanning direction are both 64 $\mu$m is used for the laser scanner 380. And for the developing agent, there is used the mixture of the insulated toner having the average particle diameter of 7 m$\mu$ and the magnetic particle (ferrite carrier) having the average particle diameter of 50 $\mu$m, in which the density of the toner is 7%.

For the magenta toner, there is used the addition of 4 parts by weight of C.I. pigment red 57: 1 pigment and 4 parts by weight of the electrification control agent and additive agents to 100 parts by weight of the polyester system main binder. For the cyan toner, there is used the addition of 4 parts by weight of C.I. pigment blue 15: 3 pigment and 4 parts by weight of the electrification control agent and additive agents to 100 parts by weight of the polyester system main binder. For the yellow toner, there is used the addition of 4 parts by weight of C.I. pigment yellow 17 pigment and 4 parts by weight of the electrification control agent and additive agents to 100 parts by weight of the polyester system main binder. For the black toner, there is used the addition of 4 parts by weight of the carbon black and 4 parts by weight of the electrification control agent and additive agents to 100 parts by weight of the polyester system main binder.

In the image formation device, namely the copying machine of the above-mentioned example, a test was made to output an image that varies from the halftone area to the background area in the sub-scanning direction with the screen line number of 400 lines/inch in the screen generator 390, without correction of the image data value described later in the data correction unit 250 of the image processing unit 200. The test found that the density of the rear end area 1B of the halftone area 1 which borders on the background area 2 was lowered, as shown with the dotted line in FIG. 21 B. The test also confirmed that the increase of the screen line number in the screen generator 390 made this lowering of the density more apparent.

In the laser beam scanner 380, the beam diameter of the laser beam L in the main scanning direction was set to 20 $\mu$m, which confirmed that the density reduction of the rear end area 1B was decreased. But, this invites the increase of the size and cost of the laser beam scanner 380. And, when the screen line number was increased, even if the beam diameter of the laser beam L in the main scanning direction was decreased, it was impossible to decrease the density reduction of the rear end area 1B to an insensible extent.

Figure 3:
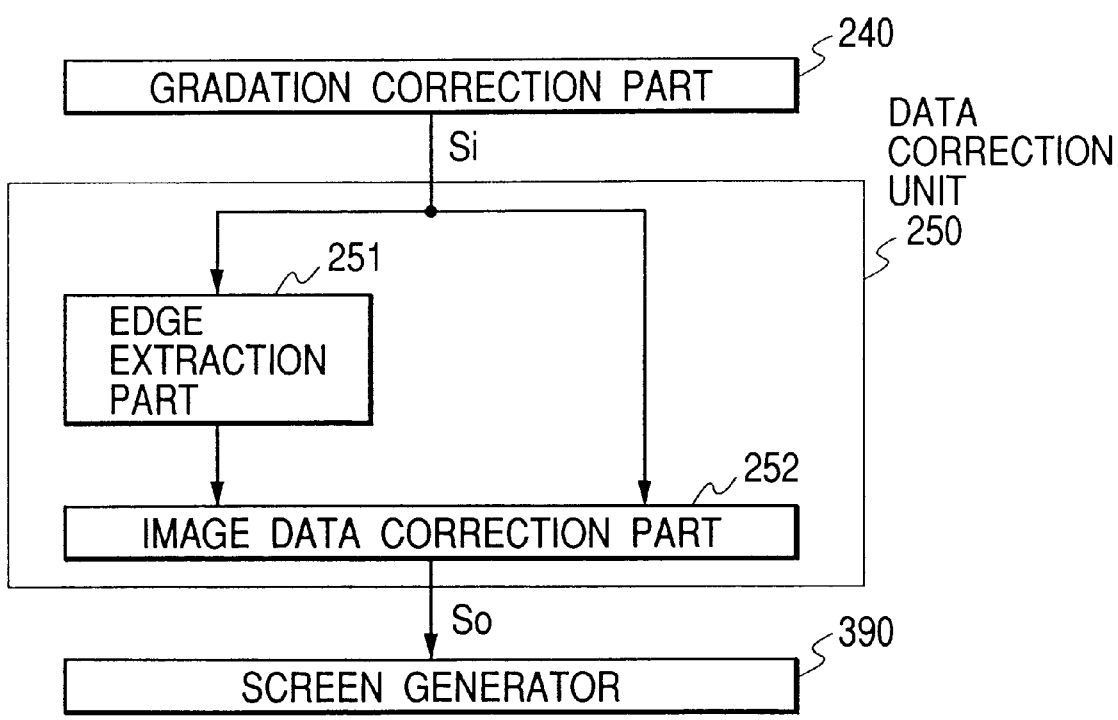
FIG. 3 is a chart to illustrate an example relating to a data correction unit of the image processing unit in FIG. 2.

However in this example, in the data correction unit 250 of the image processing unit 200, the value of the input image data incoming from the gradation correction part 240 is corrected. FIG. 3 illustrates an example of the data correction unit 250 corresponding to the first example shown in FIG. 2 of the image processing unit 200. In FIG. 3, the data correction unit 250 is comprised of an edge extraction part 251 and an image data correction part 252.

Figure 21A:
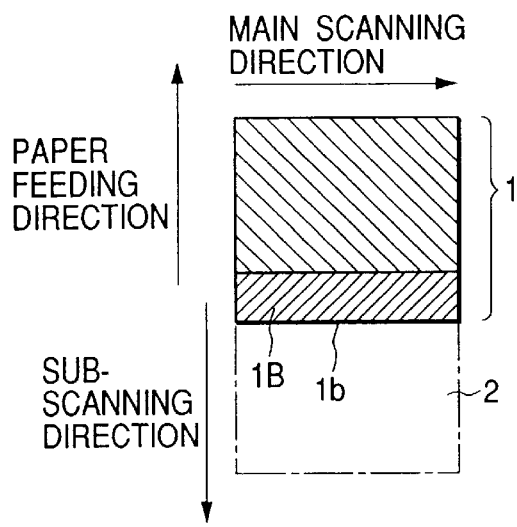
FIGS. 21A–21C are charts to illustrate a mode of the density reduction that the present invention recognizes as the problem, which can be prevented by the present invention.

The edge extraction part 251 extracts the rear edge 1b of the halftone area 1 which borders on the background area 2, when the outputted image varies from the halftone area 1 to the background area 2, from the input image data Si incoming from the gradation correction part 240, as shown in FIG. 21A.

The image data correction part 252 modifies the value of the background image data close to the rear edge 1b, of the input image data Si incoming from the gradation correction part 240 to the setting value, as mentioned later.

Figure 22A:
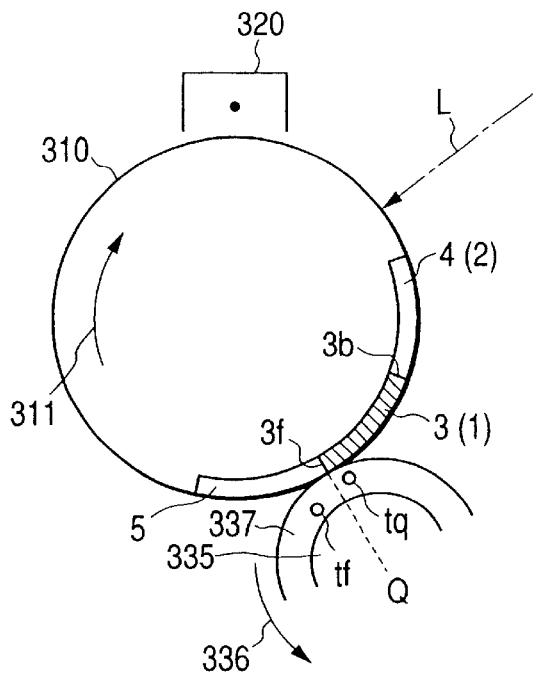
FIGS. 22A–22C are charts to illustrate the reason by which the density reduction recognized as the problem by the present invention is created.
Figure 22B:
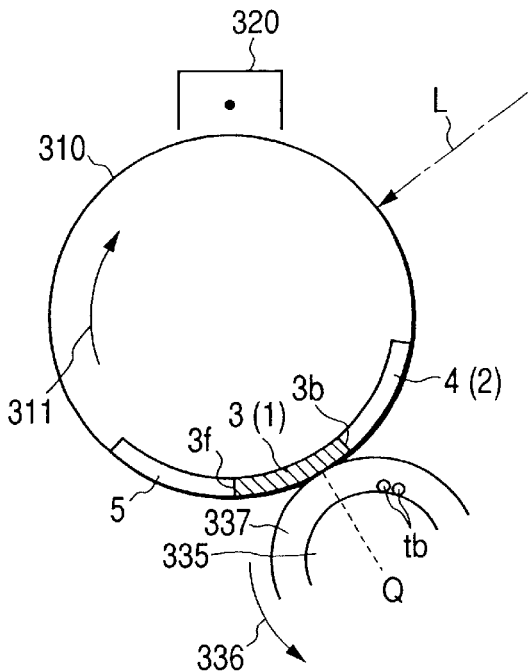
Figure 22C:
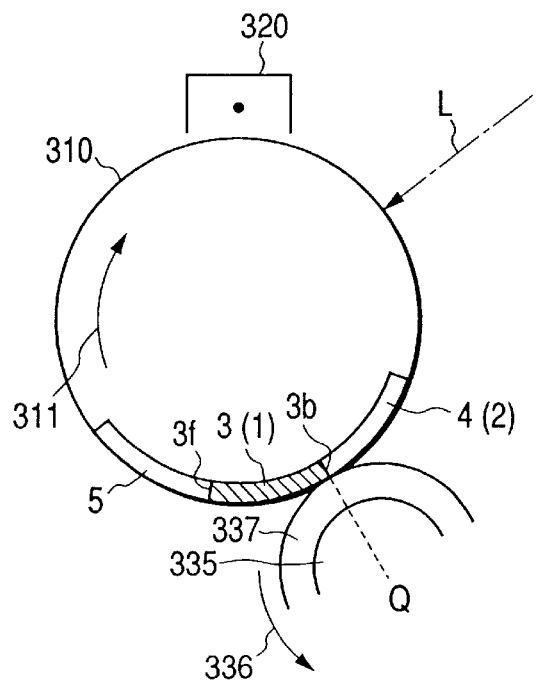

As the reason to cause TED is clearly illustrated in FIG. 22, the range of the rear end area 1B where the density reduction of the halftone area 1 is created, and the quantity of the density reduction in the rear end area 1B vary depending on the relation between a distance for which the toner is driven away from the surface of the developing agent layer 337 and a forward electric field strength applied to the toner by the potential of the latent image portion 3 corresponding to the halftone area 1 on the photosensitive drum 310, which is determined by a reverse electric field strength applied to the toner by the difference between the potential of the part 4 corresponding to the background area 2 on the photosensitive drum 310 and the potential of the developing bias and a length of time during which the toner receives the reverse electric field s trength. Therefore, the range with the density reduction created and the quantity of the density reduction depend on the image data value of the halftone area 1, namely, the image data value of the rear edge 1b of the halftone area 1 which borders on the background area 2, and the image data value of the background area 2.

Figure 23A:
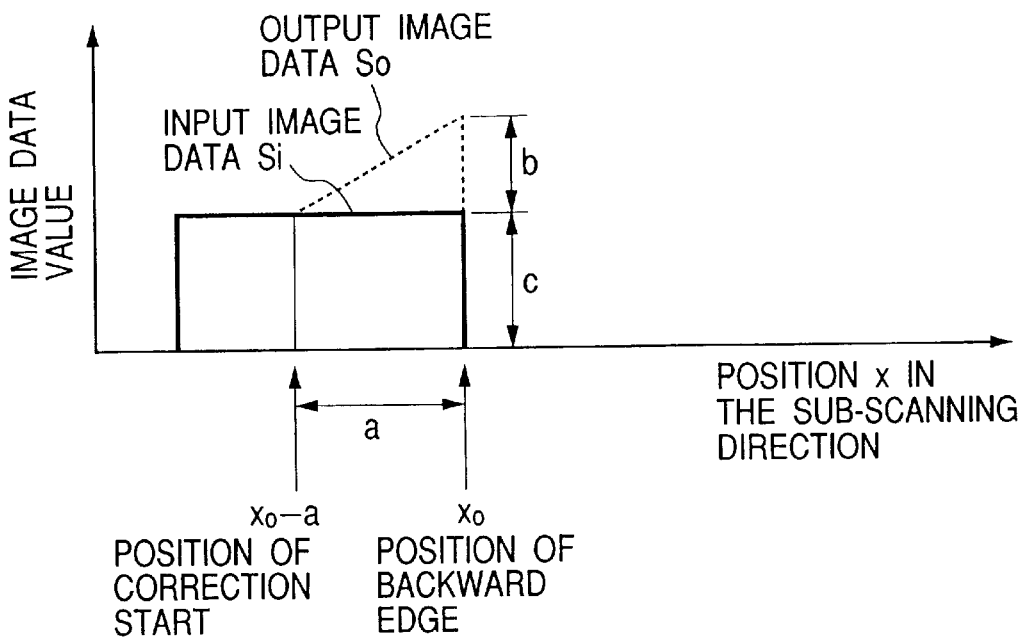
FIGS. 23A–23B are charts to illustrate the method in the related art.

And, in the Japanese Published Unexamined Patent Application No. Hei 10-65917, as shown in FIG. 23A, where the pixel number to be corrected corresponding to the range of the rear end area where the density reduction of the halftone area occurs is given by a, the correction quantity for the image data value c at the backward edge by b, the position of pixel in the sub-scanning direction by x, and the position of pixel at the backward edge.in the sub-scanning direction by xo, the correction quantity y given by the following linear expression is calculated.

$$y=(b/a)\times\{x-(xo-a)\} \quad (1)$$

The correction quantity y is added to the input image data Si over the range $xo-a \leq x \leq xo$, thus acquiring the output image data So after correction.

Figure 21C:
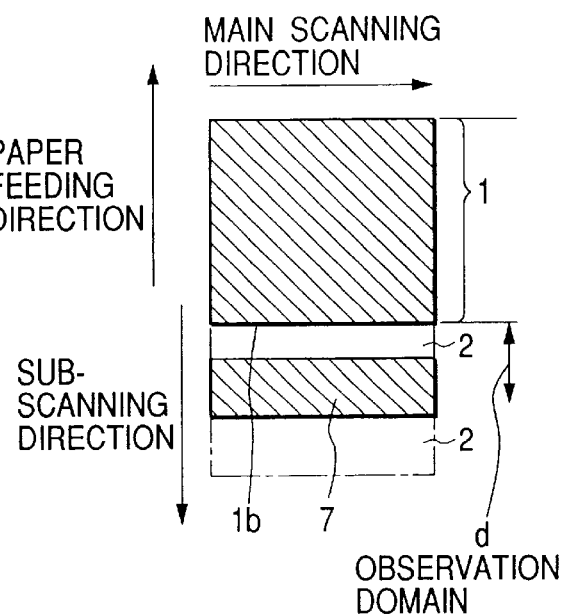
Figure 23B:
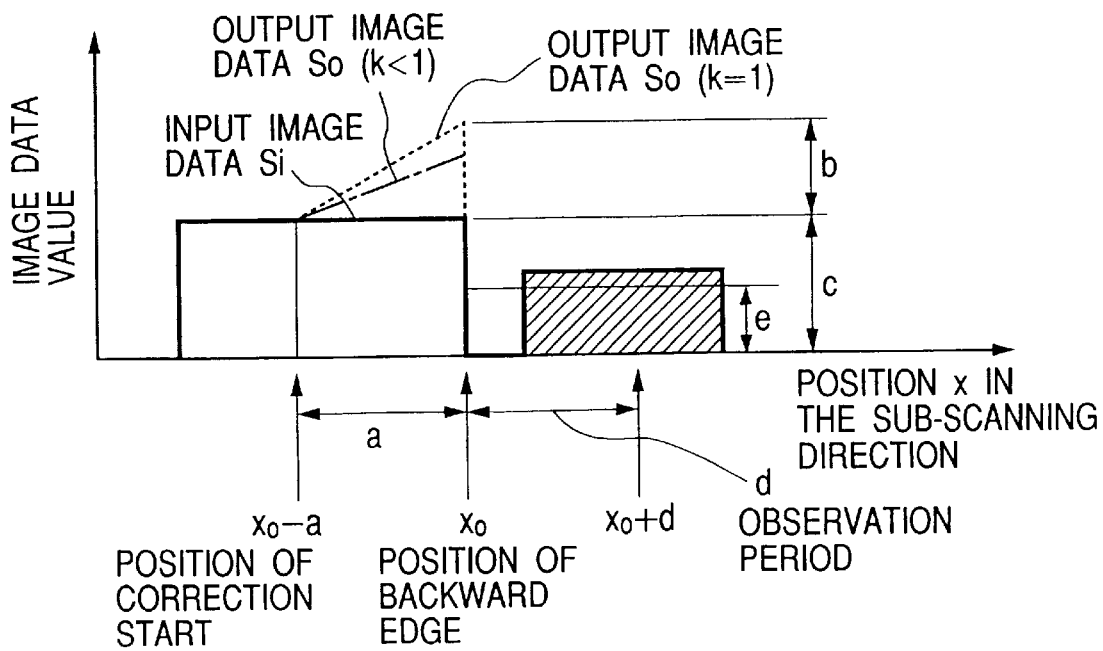

Further, the Japanese Published Unexamined Patent Application No. Hei 11-32214, as shown in FIG. 21C, gives consideration to a case in which immediately after the image has varied from the halftone area 1 to the background area 2 at the backward edge 1b, the imag e var ies again to the halftone area 7. Concretely, as shown in FIG. 23B, the correction quantity y given by the following linear expression is calculated.

$$y=k\times(b/a)\times\{x-(xo-a)\} \quad (2)$$

The correction quantity y is added to the input image data Si over the range $xo-a \leq x \leq xo$, thus acquiring the output image data So after correction.

Here, k signifies the correction coefficient; and while the image data values of pixels continuing in the sub-scanning direction are observed over a certain period d (a certain domain) after the backward edge, when the image varied from the background area 2 to the halftone area 7 during the observation period d, as shown in FIG. 21C, the average value of the image data during the period d is calculated as the image data value e after the backward edge, and when the image did not vary from the background area 2 to the halftone area 7 during the observation period d, e is regarded as 0, and k is given by the following expression.

$$k=(c-e)/c \quad (3)$$

However, as mentioned above, without the reverse electric field applied, the toner will not move away from the surface of the developing agent layer 337. Accordingly, there will not be density reduction in the halftone area 1.

As mentioned above, when the photosensitive drum 310 is electrified at the potential of, for example, −650 V by the electrifier 320 at the beginning and exposed by the laser beam L, and the potential of the photosensitive drum 310 varies to a lower potential than the developing bias potential −500 V, for example, the development is undertaken.

Here, the dot area coverage corresponding to a light exposure exceeding the developing bias is defined as the recurrence start point. Generally, in the image formation device of the electrophotography, the recurrence start point is set to about 5% in terms of the dot area coverage in order to ensure the reliability of image recurrence. Therefore, if the dot area coverage is smaller than 5%, the image will not be recurred and the background area will be presented; and if the dot area coverage is greater than 5%, the image will be recurred as the halftone.

In the edge extraction part 251 in FIG. 3, the image data are observed in the sub-scanning direction, and when the image data value exceeds a specific threshold, the image data is judged as the halftone image data. When the image data decreases lower than the threshold, the decreasing pixel is judged as the edge where the data varies from the halftone image data to the background image data.

That is, the setting of the foregoing threshold in the edge extraction part 251 to 5% being the recurrence start point will make it possible to detect all the backward edges 1b of the halftone area 1 that borders on the background area 2, which are reproduced by the image output unit 300.

Therefore, the halftone area 1 covers 5% of the recurrence start point until 100% by the gradation degree of the image data value, and the background area 2 covers 0% until 5% of the recurrence start point by the gradation degree of the image data value.

Incidentally, as long as it can detect the backward edge 1b, the edge extraction part 251 may be one based on other methods, such as one that acquires the first order differential, for example, the gradient of image data by the digital filtering, or the pattern matching.

Figure 9A:
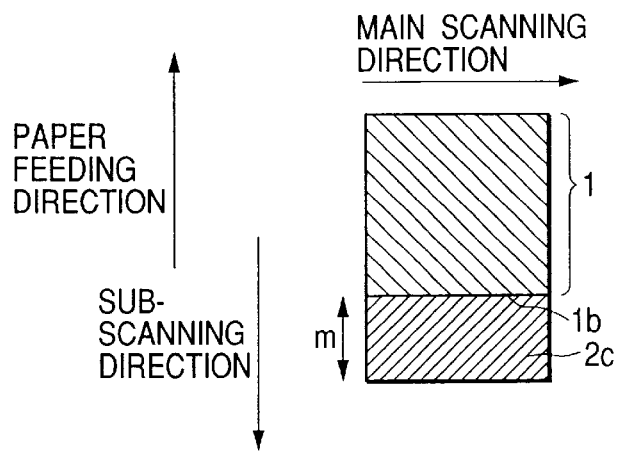
FIGS. 9A–9C are charts to illustrate the areas in which the values of the background image data are modified by the image data correction unit in FIG. 3, FIG., 5, or FIG. 6.
Figure 10A:
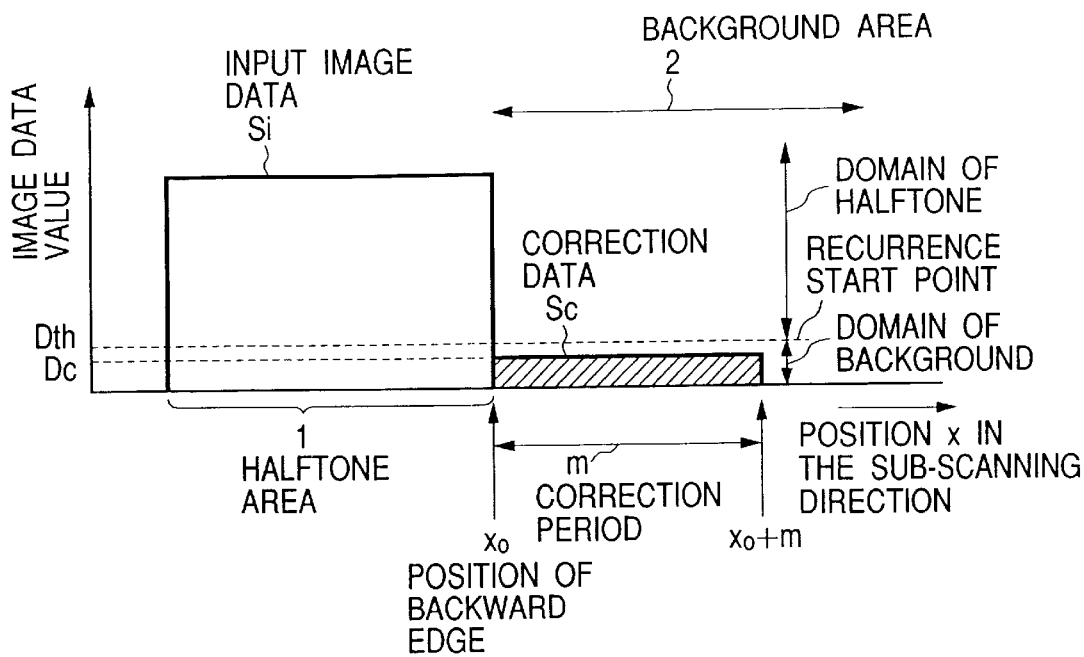
FIGS. 10A–10B are charts to illustrate the modes in which the values of the background image data are modified by the image data correction unit in FIG. 3, FIG., 5, or FIG. 6.

In the image data correction part 252, with regard to the halftone area 1 as shown in FIG. 9A, the image data value is not modified as shown by the input image data Si in FIG. 10A; and with regard to the background area 2c including m pixels after the backward edge 1b in the sub-scanning direction, the image data value is modified to a setting value Dc slightly lower than the foregoing threshold Dth, as shown by a correction data Sc in FIG. 10A.

Figure 10B:
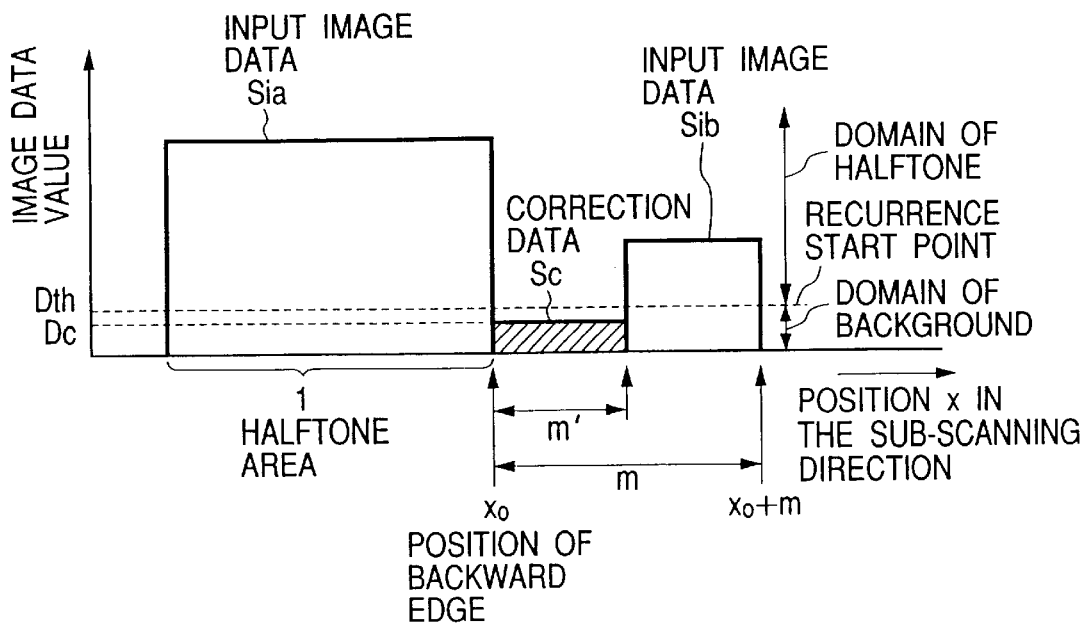

However, as shown in FIG. 10B, if there is a halftone area shown by input image data Sib, whose image data value is greater than the threshold Dth, or a background area whose image data value is greater than the setting value Dc, in a domain of mpixels lying in the sub-scanning direction after the backward edge of the halftone area 1 shown by an input image data S1a, the image data value in that domain is not modified, and only the image data value in a domain of m' pixels lying from the backward edge of the halftone area 1 to the forward edge of the input image data Sib, as shown by the correction data Sc is modified to the setting value Dc.

If the threshold Dth is 5%, the setting value Dc is set, for example, in a range of 4% or more and less than 5%. As the setting value Dc approaches to the threshold Dth, the foregoing reverse electric field becomes weak, and the suppression effect on TED increases. On the other hand, if the setting value Dc lowers against Dth, the reverse electric field remains strong, and the suppression effect on TED decreases. Further, if the setting value Dc is close to the threshold Dth, the background area will be recurred to create the phenomenon called fogging, when the recurrence start point, namely, the threshold Dth drifts depending on the environmental change.

However, by limiting the domain in which the image data value is modified to the background area 2c including m pixels after the backward edge 1b in the sub-scanning direction, this example exhibits an advantage that there is less visibility even in case of the presence of fogging.

Figure 9B:
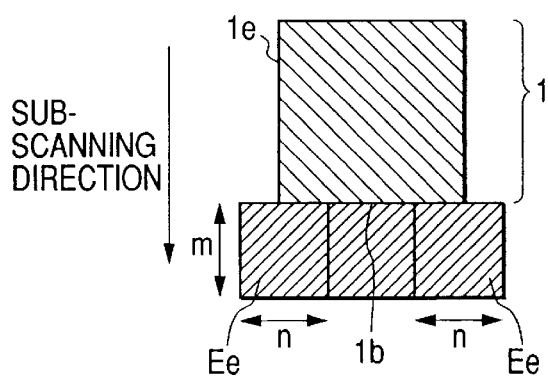
Figure 9C:
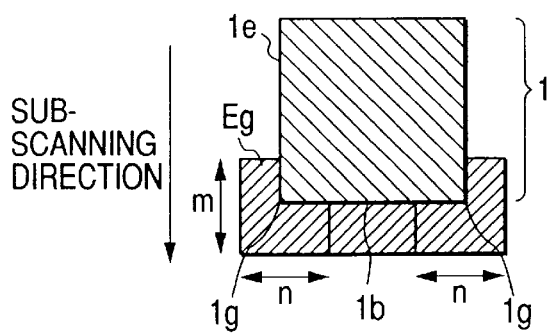

As shown in FIG. 9B, the background area in which the image data value is modified to the setting value Dc may be made by adding a domain Ee including m pixels in the sub-scanning direction and n pixels in the main scanning direction, which lies after the backward edge 1b with a line acquired by extending an edge 1e in the main scanning direction of the halftone area 1 from the backward edge 1b toward the sub-scanning direction as the center line of the domain. Or, as shown in FIG. 9C, it may be made by adding a domain Eg including m pixels in the sub-scanning direction and n pixels in the main scanning direction, which lies with an end point 1g of the backward edge 1b in the main scanning direction as the center.

Figure 21B:
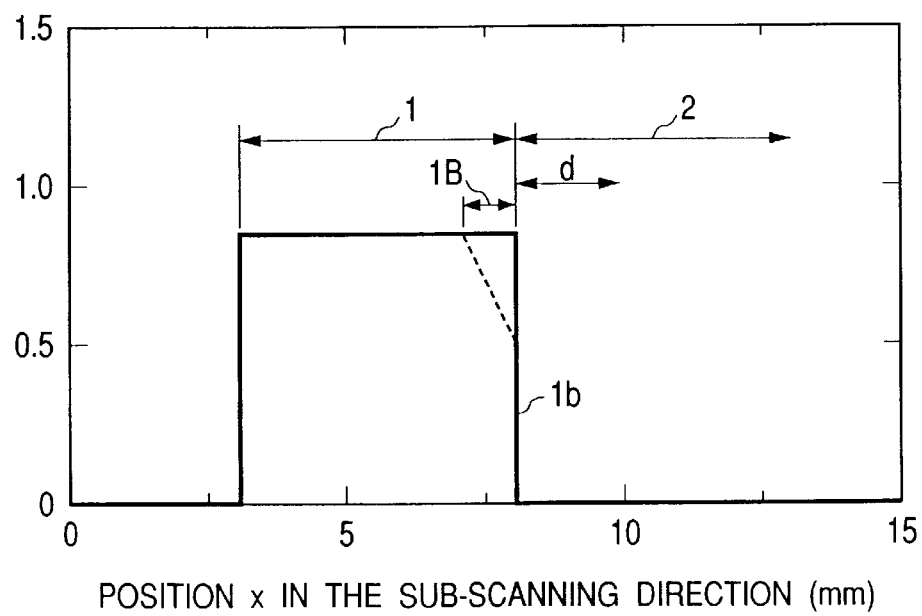

FIG. 21B illustrates the measurement result of the density when the patches with the input dot area coverage 40% are outputted in a monochromatic black with the screen line number 400 lines/inch. In this drawing, the dotted line shows a case where the present invention is not applied, that is, a case where the value of the background image data is not modified by the data correction unit 250, and the solid line shows a case where the present invention is applied, that is, a case where the value of the foregoing background image data is modified to the setting value Dc by the data correction unit 250.

In the foregoing example, on the presumption that the recurrence start points of the four colors YMCK are one and the same, the image data correction part 252 modifies the value of the background image data to the same setting value Dc for each of the colors YMCK, but it may modify the value to different setting values for the respective colors. Or, it may modify to different setting values depending on each screen line number in the image output unit 300.

Further, the system may be constructed such that a user can specify the setting value Dc through a user interface of the operation panel and the like, on the basis of the output result of images corrected by the setting value. Also in this case, the screen line number or each of the colors YMCK may be made to be specified individually.

Figure 11:
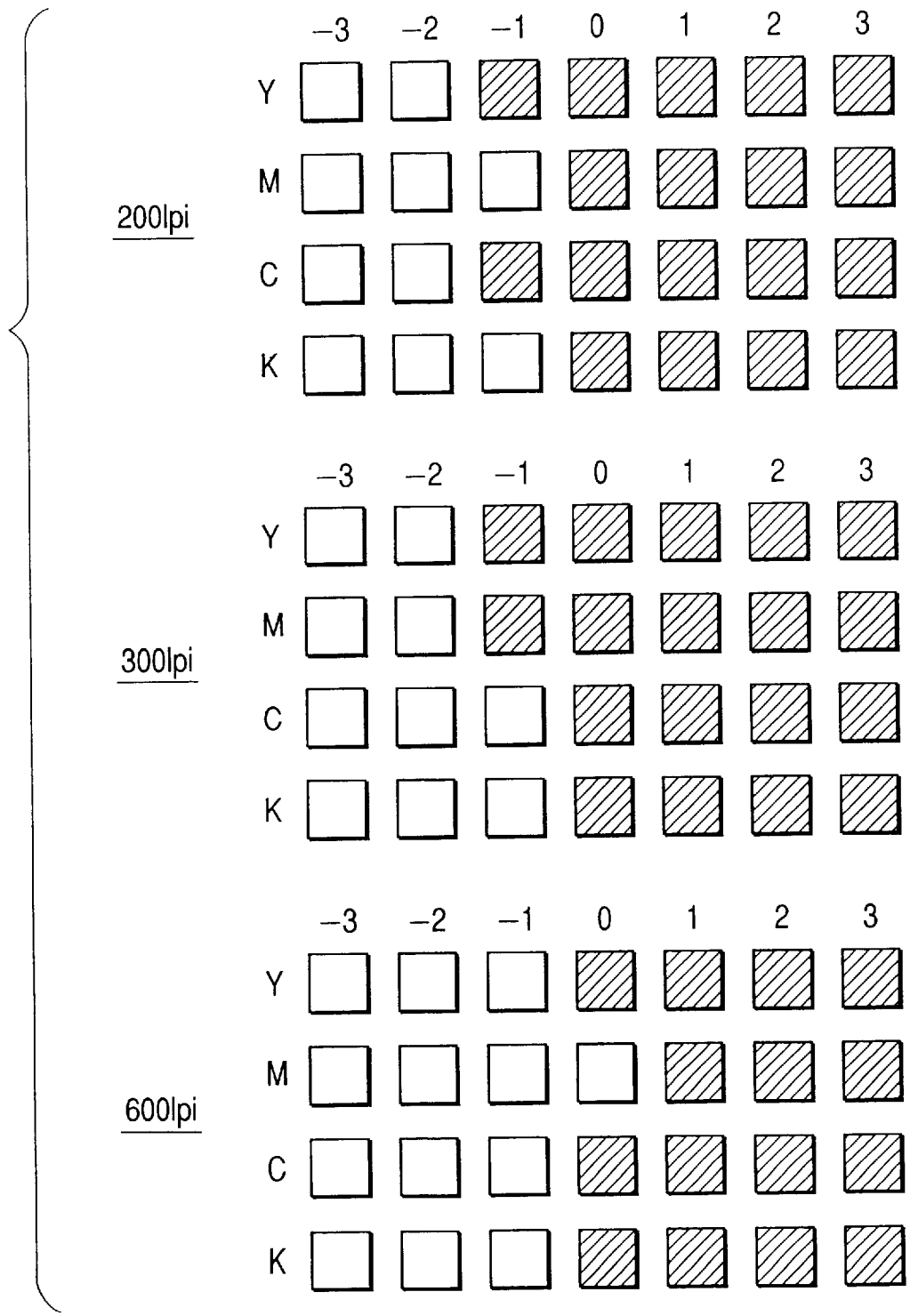
FIG. 11 is a chart to explain one method whereby a user designates the setting value of a background image data.

Further, it is preferable to make the system such that a user can designate the setting value Dc, through the user operation of outputting the patch images with the image data close to the recurrence start point for each screen line number and each of the colors YMCK, selecting the invisible upper limit patch image from the outputted patch images, and inputting the number. In the case of FIG. 11, the image data value of each color is within 0 to 256, in conformity with the 256 gradations. The number '0' indicates the patch image of the image data value 13, the number '−1' indicates the patch image of the image data value 12, and the number '1' indicates the patch image of the image data value 14; and in the case of 'Yellow' with the screen line number 200 lines/inch, the number of the invisible upper limit patch image is '−2'.

According to the first embodiment thus described, in the image processing device that processes the input image data, or in the image formation device provided with the above image processing device as the image processing unit, the present invention makes it possible to prevent the density reduction in the rear end area of the halftone area which borders on the background area, when the outputted image varies from the halftone area to the background area in the sub-scanning direction, by simplified and small-scale processing without inviting the size expansion and cost increase of the image output device or image output unit. Further, since the prevention of the density reduction is possible even in case of increasing the screen line number for a higher resolution of output images, the present invention easily achieves to enhance the resolution of output images.

[Embodiment 2: FIG. 1, FIG. 4, FIG. 5, FIG. 9 through FIG. 11]

Figure 4:
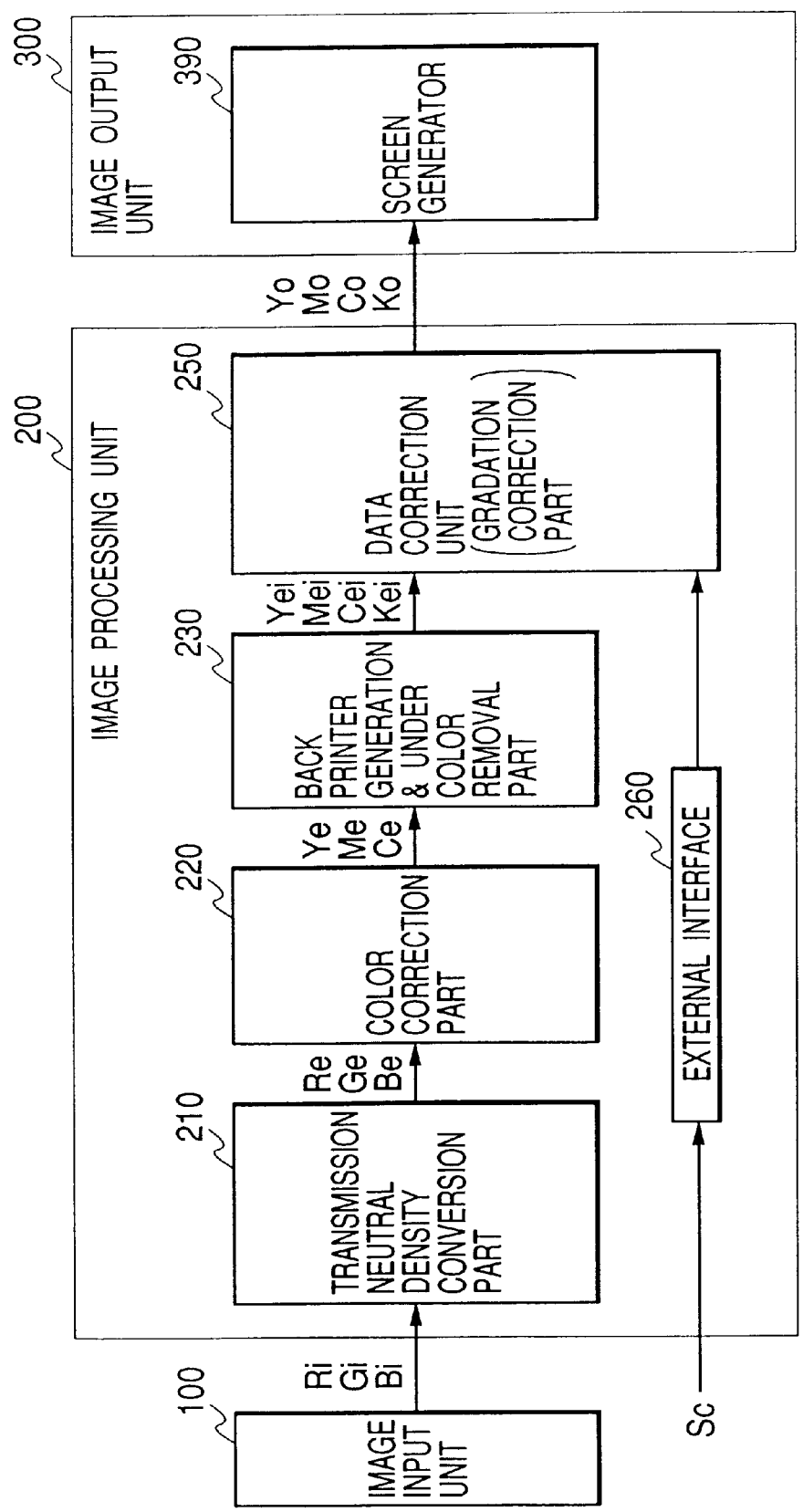
FIG. 4 is a chart to illustrate a second example of the image processing unit of the copying machine in FIG. 1.

FIG. 4 illustrates a second example of the image processing unit 200 shown in FIG. 1. In the first example in FIG. 2, the image signals Yi, Mi, Ci, Ki corrected in gradation by the gradation correction part 240 are supplied to the data correction unit 250 as the input image data Si as shown in FIG. 3; and the value of the background image data is modified, as mentioned above. However, in this second example, the signals Yei, Mei, Cei, Kei from the black printer generation & under color removal part 230 are supplied to the data correction unit 250, where the correction of the gradation and the modification of the background image data are executed.

Figure 5:
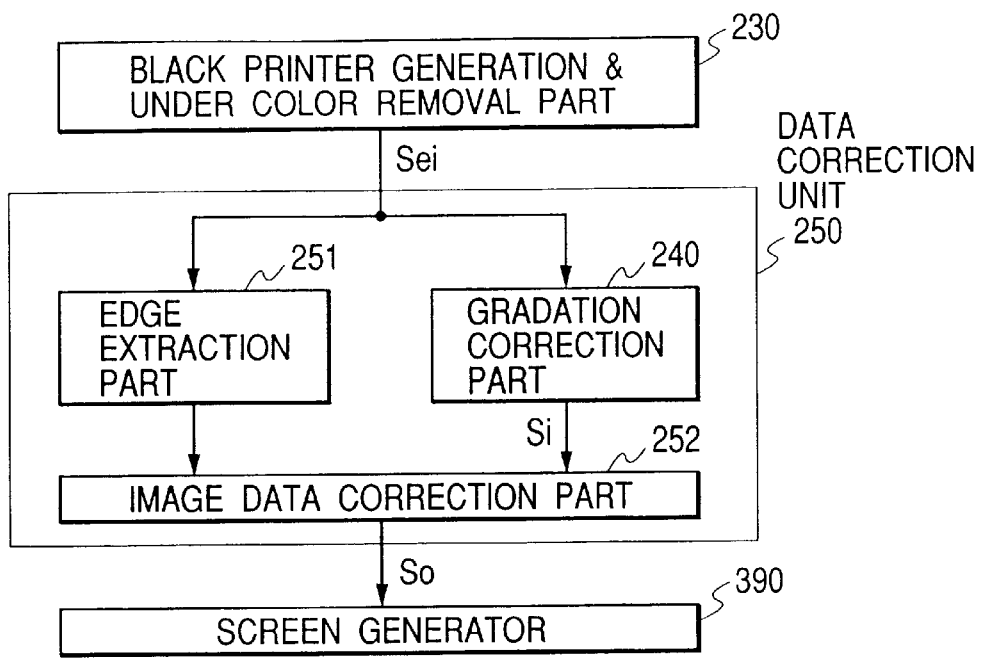
FIG. 5 is a chart to illustrate an example relating to the data correction unit of the image processing unit in FIG. 4.

FIG. 5 illustrates one example of the data correction unit 250 in this case, in which the data correction unit 250 comprises the gradation correction part 240, edge extraction part 251, and image data correction part 252.

The gradation correction part 240 corrects the signal Sei (Yei, Mei, Cei, Kei) supplied from the black printer generation & under color removal part 230 in terms of gradation. The edge extraction part 251 extracts from the signal Sei incoming from the black printer generation & under color removal part 230, in the same manner as in the Embodiment 1, the backward edge of the halftone area bordering on the background area, when the outputted image varies from the halftone area to the background area in the sub-scanning direction.

And, the image data correction part 252 modifies the value of the background image data close to the objective edge of the signal Si (Yi, Mi, Ci, Ki) corrected in gradation by the gradation correction part 240 to the setting value Dc, on the basis of the edge information extracted by the edge extraction part 251.

Therefore, the creation of TED can be prevented in the same manner as in the Embodiment 1. Moreover in this Embodiment 2, even through the color signal Sc incoming from external devices accepted to the image processing unit 200 through the external interface 260 shown in FIG. 4 does not conform with the gradation characteristic of the image output unit 300, the creation of TED can appropriately be prevented by setting the edge extraction level in the edge extraction part 251 so as to respond to the color signal Sc incoming from external devices.

[Embodiment 3: FIG. 1, FIG. 4, FIG. 6, FIG. 9, FIG. 10, FIG. 12]

Figure 6:
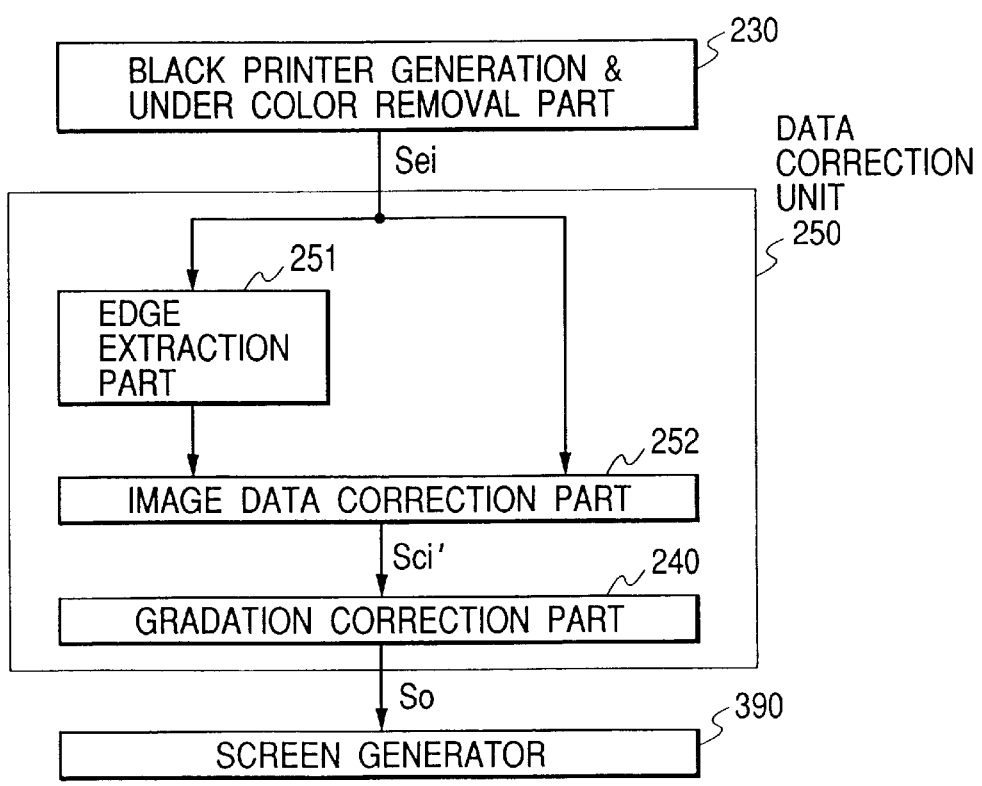
FIG. 6 is a chart to illustrate another example relating to the data correction unit of the image processing unit in FIG. 4.

FIG. 6 illustrates another example of the data correction unit 250 when the image processing unit 200 is constructed as in FIG. 4, in which the data correction unit 250 comprises the edge extraction part 251, image data correction part 252, and gradation correction part 240.

The edge extraction part 251 extracts the backward edge of the halftone area bordering on the background area, when the outputted image varies from the halftone area to the background area in the sub-scanning direction, from the signal Sei (Yei, Mei, Cei, Kei) supplied from the black printer generation & under color removal part 230, in the same manner as in the Embodiment 1, 2.

The image data correction part 252 modifies the value of the background image data close to the objective edge, of the signal Sei supplied from the black printer generation & under color removal part 230 which is not yet corrected in gradation not to the foregoing setting value Dc but to a specific value greater than 0 being the background image data value and smaller than the setting value Dc, for example, 1, on the basis of the edge information extracted by the edge extraction part 251.

And, in the gradation correction part 240, the image data Sei' in which the value of the background image data close to the objective edge from the image data correction part 252 is modified to a specific value, for example, 1 is corrected in gradation, and the output image data So (Yo, Mo, Co, Ko) is obtained.

As the gradation correction part 240, one-dimensional lookup table is used. Generally, the lookup table that constitutes the gradation correction part is set in such a manner that when the input value is 0, also the output value is 0, so that the relation between the input and the output does not become discontinuous.

Figure 12:
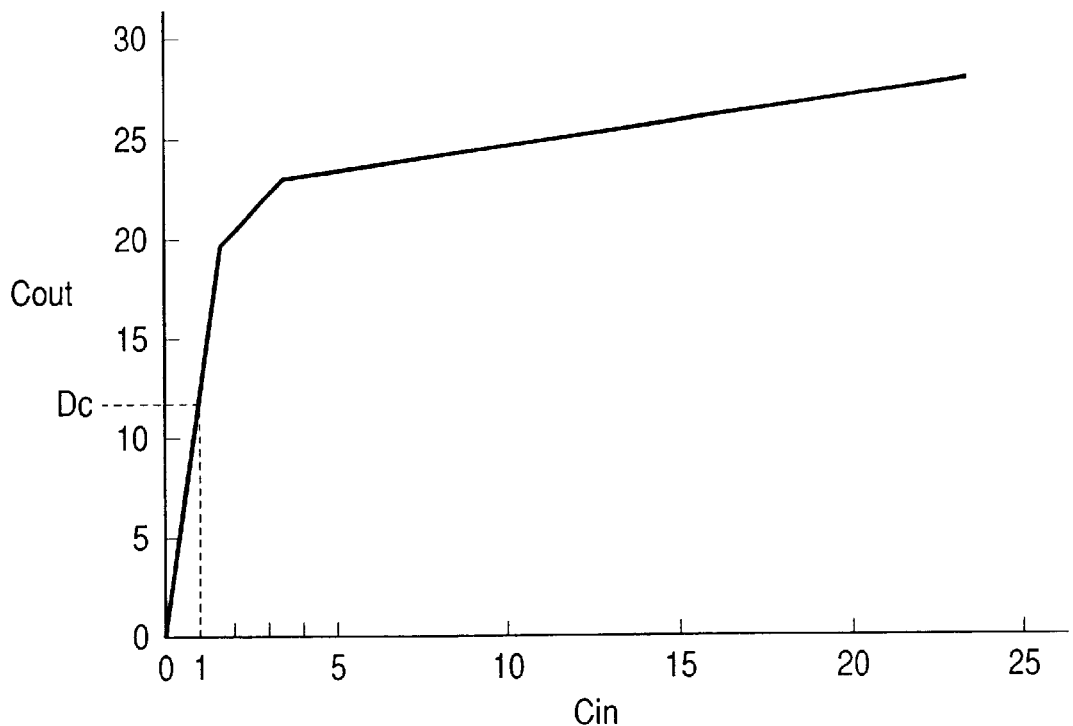
FIG. 12 is a chart to illustrate one example of the gradation correction characteristic of the gradation correction unit in FIG. 6 or FIG. 7.

Also in this example, the lookup table that constitutes the gradation correction part 240 is set in such a manner that when the input value Cin is 0, also the output value Cout is 0, as shown in FIG. 12; however, it is set such that when the input value Cin is the foregoing specific value, namely 1, the output value Cout is also the foregoing setting value Dc.

Therefore, since the value of the background image data close to the objective edge is converted into the setting value Dc in the end, the creation of TED can be prevented in the same manner as in the Embodiment 1, 2.

[Embodiment 4 : FIG. 1, FIG. 4, FIG. 7, FIG. 12]

Figure 7:
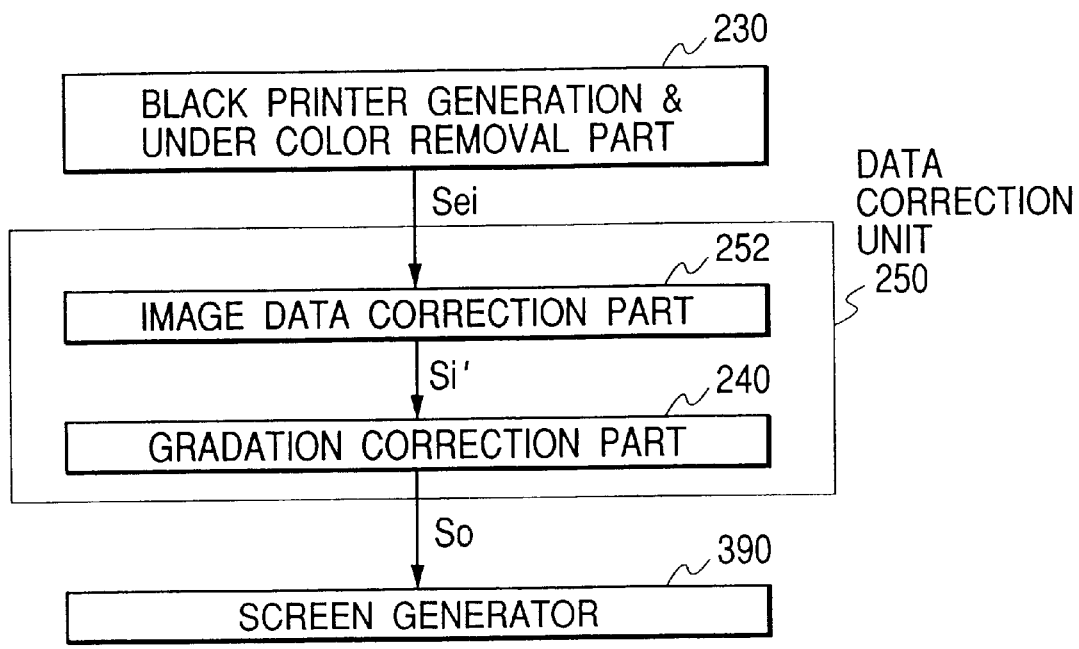
FIG. 7 is a chart to illustrate a still another example relating to the data correction unit of the image processing unit in FIG. 4.

FIG. 7 illustrates a still another example of the data correction unit 250 when the image processing unit 200 is constructed as in FIG. 4, in which the data correction unit 250 comprises the image data correction part 252 and gradation correction part 240.

In this example, the image data correction part 252 modifies all the values of the background image data, of the signal Sei (Yei, Mei, Cei, Kei) supplied from the black printer generation & under color removal part 230 which is not yet corrected in gradation not to the foregoing setting value Dc, but to a specific value greater than 0 being the background image data value and smaller than the setting value Dc, for example, 1.

And, in the gradation correction part 240, the image data Si', in which all the values of the background image data from the image data correction part 252 are modified to a specific value, for example, 1, is corrected in gradation, and the output image data So (Yo, Mo, Co, Ko) is obtained.

As the gradation correction part 240, one-dimensional lookup table is used. And also in this example, in the same manner as in the Embodiment 3, the lookup table that constitutes the gradation correction part 240 is set in such a manner that when the input value Cin is 0, also the output value Cout is 0, as shown in FIG. 12; however, it is set such that when the input value Cin is the foregoing specific value, namely 1, the output value Cout is also the foregoing setting value Dc.

Therefore, all the values of the background image data are converted into the setting value Dc in the end, and the creation of TED can be prevented. Moreover in this example, since the edge extraction is not performed, the processing for preventing the creation of TED can significantly be simplified.

However in this example, not only the value of the background image data close to the edge that vary from the halftone area to the background area in the sub-scanning direction, but also all the values of the output images from the background area without images are set to the setting value Dc. Therefore, when the recurrence start point drifts depending on the adjustment or the environments and the setting value Dc becomes higher than the recurrence start point only to create the fogging, the area where the fogging is created is widened, which makes the fogging easy to view.

However, in the image formation device of the electrophotography, it is widely known that the output characteristic is influenced by environmental variations, and as a countermeasure against this, a method called the process control has been employed. This method is to maintain the gradation of the output images by modifying the conditions such as light exposure and electrification quantity, etc., when the environments have varied or the environmental variations are presumed, and when the reference patches of a plurality of the densities are formed on the photosensitive structure and the density is measured by a sensor, which finds that the measured value is off the target. Therefore, if the setting value Dc is set to an appropriate value at the initial adjustment, the fogging due to the environmental variations can be prevented, and the creation of TED can be prevented.

[Embodiment 5: FIG. 1, FIG. 4, FIG. 8, FIG. 13]

Figure 8:
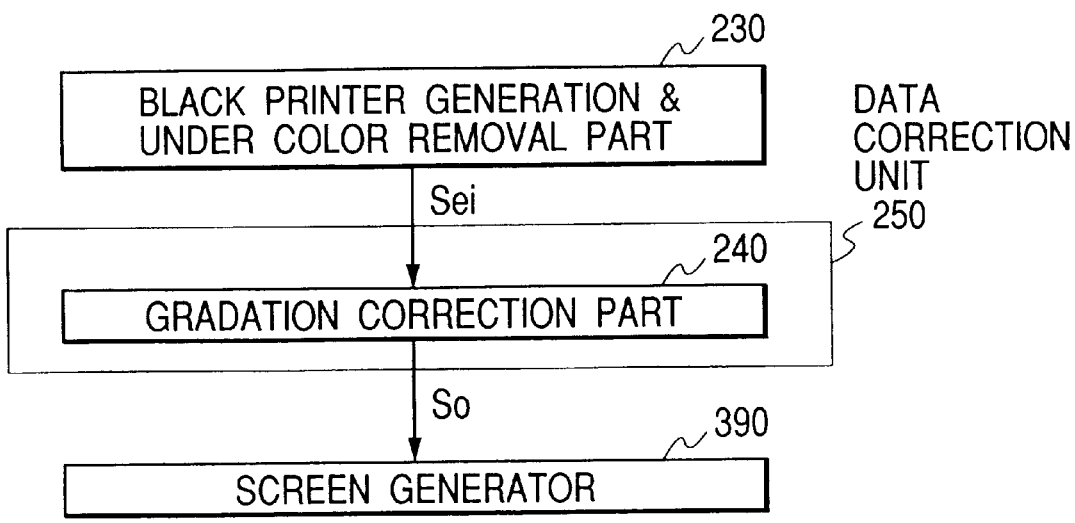
FIG. 8 is a chart to illustrate a still another example relating to the data correction unit of the image processing unit in FIG. 4.

FIG. 8 illustrates a still another example of the data correction unit 250 when the image processing unit 200 is constructed as in FIG. 4, in which the data correction unit 250 comprises only the gradation correction part 240. When it corrects in gradation the signal Sei (Yei, Mei, Cei, Kei) supplied from the black printer generation & under color removal part 230, the gradation correction part 240 modifies at the same time all the values of the background image data of the signal Sei to the foregoing setting value Dc.

Figure 13:
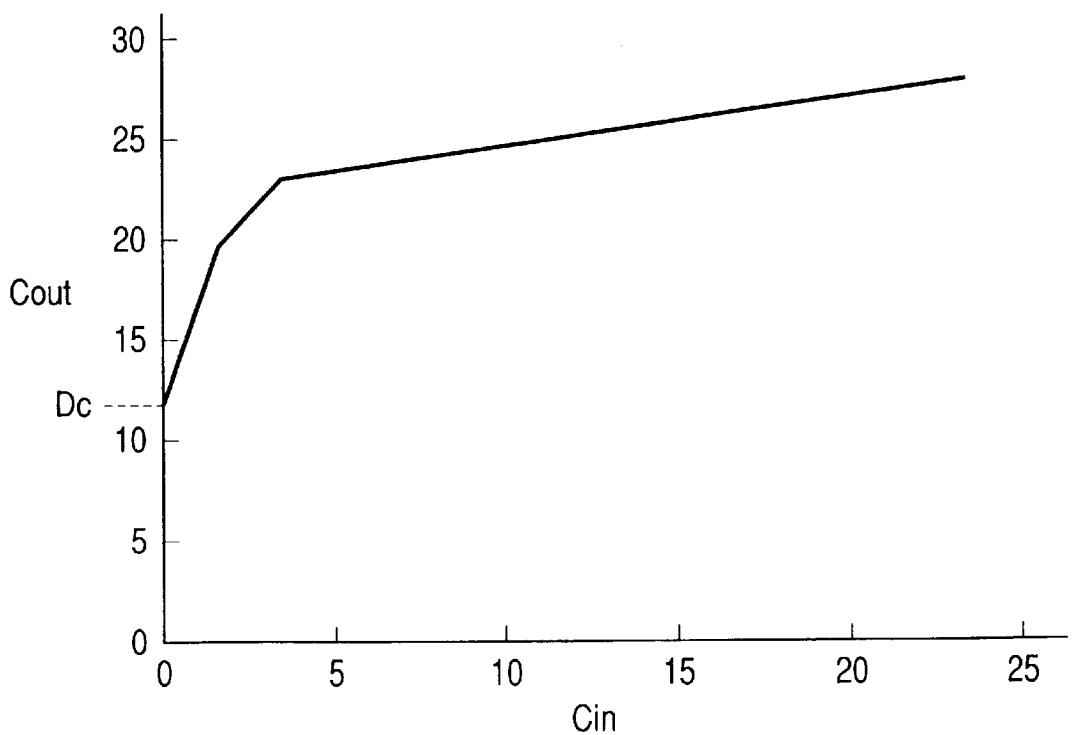
FIG. 13 is a chart to illustrate one example of the gradation correction characteristic of the gradation correction unit in FIG. 8.

As the gradation correction part 240, one-dimensional lookup table is used, and the lookup table is set in such a manner that when the input value Cin is 0 being the background image data value, the output value Cout is the foregoing setting value Dc, as shown in FIG. 13.

Therefore, in the same manner as in the Embodiment 4, all the values of the background image data are converted into the setting value Dc, and the creation of TED can be prevented.

[Embodiment 6: FIG. 14 through FIG. 17]

Figure 14:
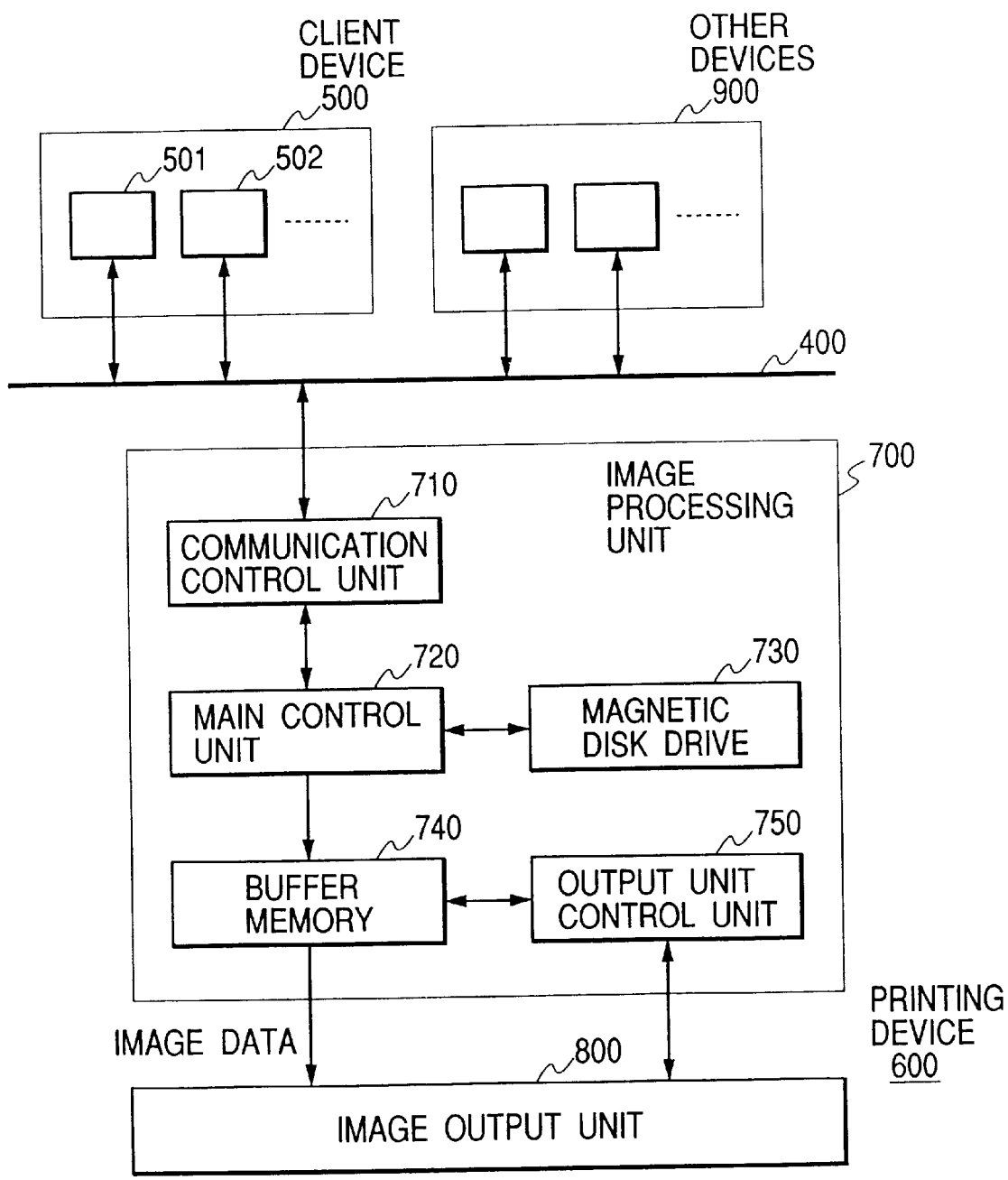
FIG. 14 is a chart to illustrate the total construction of a network printer system using one example of the image processing device of the present invention.

FIG. 14 illustrates the total construction of a network printer system employing an example of the image processing device of the present invention and an example of the image formation device of the present invention. The network printer system connects a client device 500, printing device 600, and other devices 900 through a network 400.

The network 400 is, for example, the Ethernet (Ethernet: trademark of Xerox, USA), on which a plurality of protocols can be operational in response to the applications of the client device 500, printing device 600, and other devices 900.

The client device 500 includes a plurality of client devices 501, 502, . . . Each of the client device 501, 502, . . . includes a computer or a work station, and each transmits the printing information described in the Page Description Language (hereunder, called PDL) to the printing device 600 and other devices 900.

This network printer system corresponds to the OPI system (Open PrePress Interface: trademark of Aldus, USA), and the printing information from the client device 500 described in the PDL, that is, the PDL command/data includes the OPI command corresponding to the OPI system.

The OPI system connects a client device and a plurality of printing devices, in which at least one of a plurality of the printing devices holds high resolution image data in its storage unit, the client device executes the edit processing based on low resolution information corresponding to the high resolution image data, and the printing device holding the high resolution image data outputs the high resolution image data on the basis of the printing information of the page layout program from the client device, whereby the page layout processing of the image data can be carried out without increasing the traffics on the network and without increasing the loads on the client device.

The printing device 600 is an example of the image formation device of the present invention, and corresponds to the foregoing OPI system. The printing device 600 includes an image processing unit 700 and an image output unit 800, and the image processing unit 700 is an example of the image processing device of the present invention. The image output unit 800 is based on the electrophotography and the two-component magnetic brush developing system, in the same manner as the image output unit 300 of the Embodiment 1 through 5 shown in FIG. 1. The image processing unit 700 and the image output unit 800 may be installed in physically separate units, or the image processing unit 700 may be incorporated physically into the image output unit 800 to form one unit.

The other devices 900 include printers other than the printing device 600, servers such as a print server, disk server, and mail server. These printing devices and servers are each composed of plural components.

The image processing unit 700 of the printing device 600 is provided with a communication control unit 710, main control unit 720, magnetic disk drive 730, buffer memory 740, and output unit control unit 750.

The communication control unit 710 connects the image processing unit 700 to the client device 500 and the other devices 900 through the network 400, and controls communications by means of, for example, the CSMA/CD (Carrier Sense Multiple Access/Collision Detect) that is employed as the control system of the Ethernet.

The information inputted to the image processing unit 700 from the client device 500 or the other devices 900 by the communication control unit 710 is passed to the main control unit 720, where the analysis of the communication protocol and the interpretation of the PDL are executed, the image data outputted by the image output unit 800 is expanded, and as mentioned later, the image data value is corrected and the image data after correction is written in the buffer memory 740.

The operation system, device driver, and application software which control the whole image processing unit 700 including the communication control unit 710, main control unit 720, buffer memory 740, and output unit control unit 750 are installed in the magnetic disk drive 730. These operation system, etc., are loaded into the main storage unit omitted in the drawing from the magnetic disk drive 730 and executed, whenever required.

Further, the foregoing high resolution image data corresponding to the OPI system is stored in the magnetic disk drive 730, and is read out to the main control unit 720 from the magnetic disk drive 730 by the foregoing OPI command, whenever required. Further, the magnetic disk drive 730 is served as a temporary shelter for data, when the foregoing main storage unit or the buffer memory 740 becomes short in capacity.

Thus, in the buffer memory 740 are temporarily stored the output image data obtained by the main control unit 720. While communicating with the image output unit 800, the output unit control unit 750 controls the buffer memory 740, whereby the output image data is read out from the buffer memory 740 to be sent to the image output unit 800, in which the output images are acquired.

Figure 15:
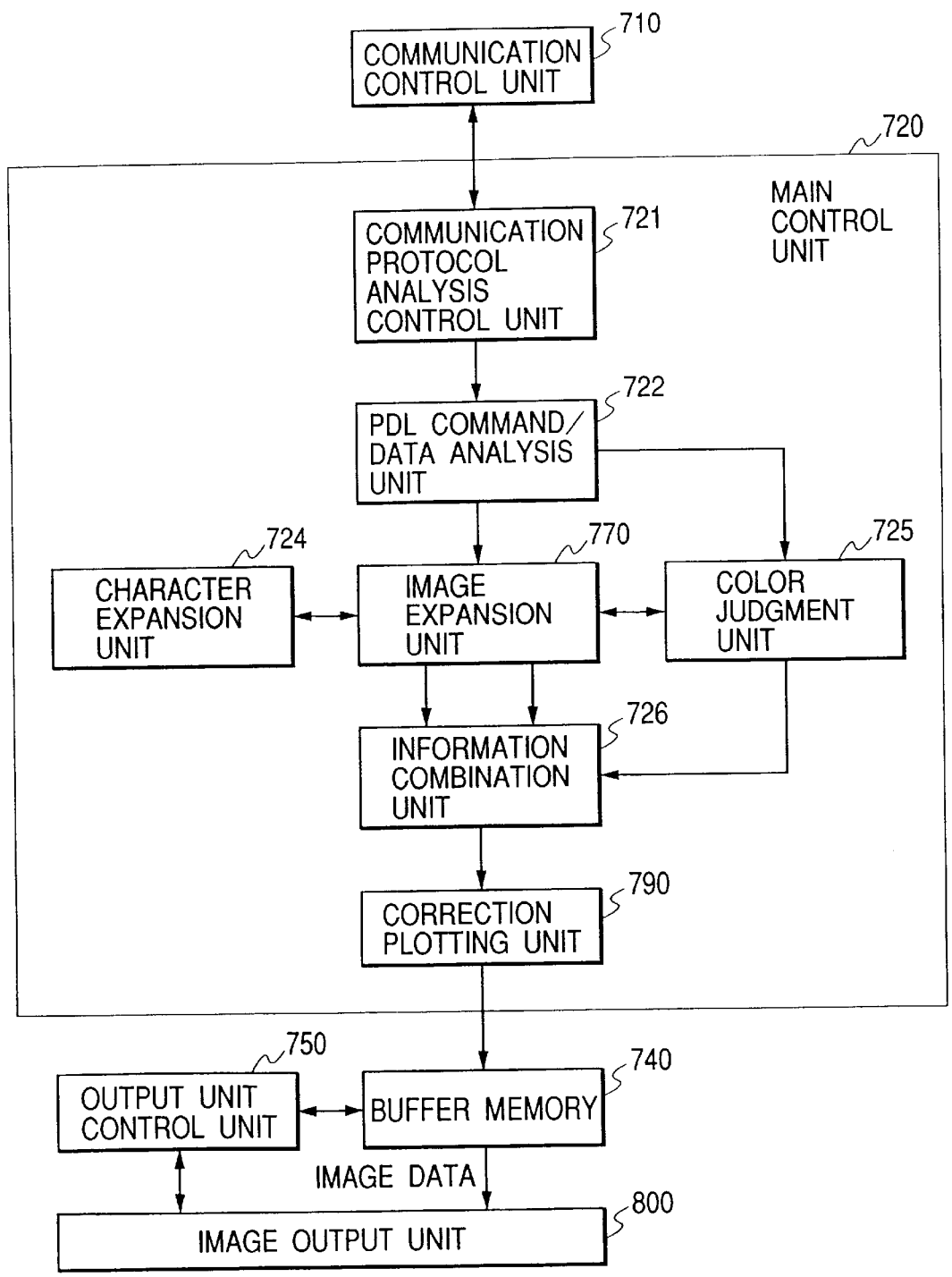
FIG. 15 is a chart to illustrate one example of the image processing unit of the system in FIG. 14.

As shown in FIG. 15, the main control unit 720 comprises a communication protocol analysis control unit 721, PDL command/data analysis unit 722, image expansion unit 770, character expansion unit 724, color judgment unit 725, information combination unit 726, and correction plotting unit 790. The communication protocol analysis control unit 721 is connected to the communication control unit 710, and the correction plotting unit 790 is connected to the buffer memory 740. Here in FIG. 15, the magnetic disk drive 730 is omitted.

The information inputted to the communication control unit 710 from the client device 500 or the other devices 900 is inputted to the communication protocol analysis control unit 721 from the communication control unit 710. The information inputted to the communication protocol analysis control unit 721 includes the printing information described by the PDL in which fetched image information and code information are intermingled, namely, the PDL command/data. The PDL command/data can include the OPI command.

The communication protocol analysis control unit 721 analyzes the protocol of the information inputted thereto, and of the inputted information, the PDL command/data is transferred to the PDL command/data analysis unit 722. Being associated with a plurality of the protocols, the communication protocol analysis control unit 721 supports, for example, the TDP/IP, AppleTalk (trademark of Apple, USA), and IPX/SPX.

When the image processing unit 700 sends information to the client device 500 or the other devices 900, the communication protocol analysis control unit 721 controls the communication protocol associated with the client device 500 or the other devices 900, and outputs the relevant information to the communication control unit 710.

The PDL command/data inputted to the PDL command/data analysis unit 722 through the communication control unit 710 and the communication protocol analysis control unit 721 is analyzed by the PDL command/data analysis unit 722. The PDL command/data analysis unit 722 analyzes a plurality of PDLs including the PostScript (PostScript: trademark of Adobe Systems, USA), InterPress (InterPress: trademark of Xerox, USA), and the like, and converts them into intermediate code data.

The resolution information of the image output unit 800, and the image shape information of the outline, position, rotation angle, and the like which are obtained in the PDL command/data analysis unit 722 are passed to the image expansion unit 770 from the PDL command/data analysis unit 722. The image expansion unit 770 expands the image data outputted by the image output unit 800 in accordance with this data.

In this case, when the code data from the PDL command/data analysis unit 722 contains the character information, the image expansion unit 770 fetches the outline information from the character expansion unit 724, and expands the image data as to the character. The image expansion unit 770 executes the processing such as the compression and expansion of data, enlargement and shrinkage of images, rotation and mirror image, and resolution conversion, etc., on the basis of the code data from the PDL command/data analysis unit 722.

The color judgment unit 725 generates parameters for converting the image data expanded by the image expansion unit 770 into the image data of each color of YMCK, and sends out the parameters to the information combination unit 726, on the basis of the color information of the PDL command/data analyzed by the PDL command/data analysis unit 722. In the information combination unit 726, the image data expanded by the image expansion unit 770 is converted into the image data of each color of YMCK.

The image data of each color of YMCK from the information combination unit 726 is supplied as input image data to the correction plotting unit 790, in which the value of the input image data is corrected as mentioned later, and the image data of each color of YMCK after correction is written into the buffer memory 740 as output image data. The image data is read out in each color of YMCK from the buffer memory 740, and the image data read out is supplied to the image output unit 800.

Figure 16:
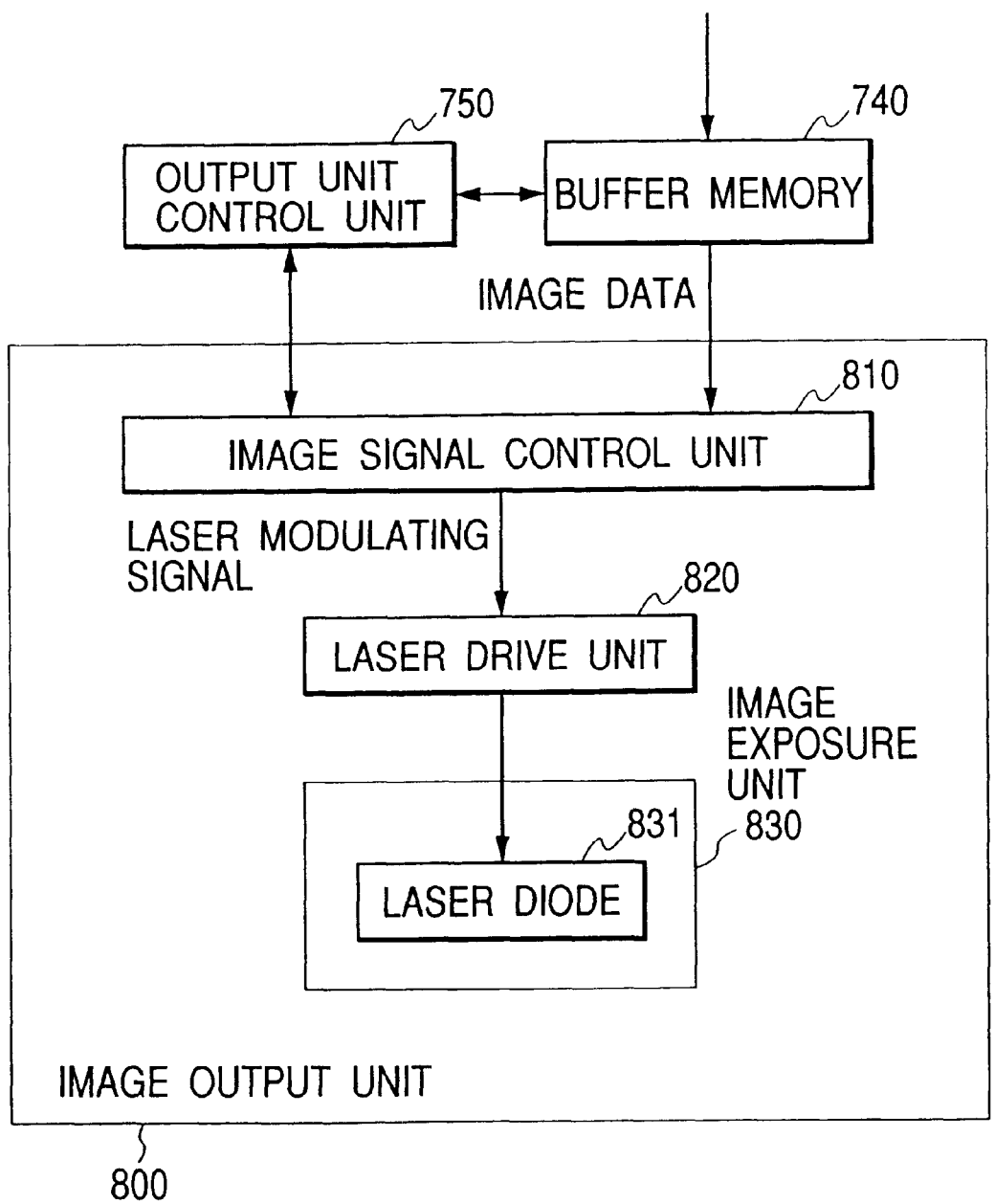
FIG. 16 is a chart to illustrate one example of the image output unit of the system in FIG. 14.

As shown in FIG. 16, the image output unit 800 contains an image signal control unit 810, laser drive unit 820, and image exposure unit 830. The image data read out from the buffer memory 740 of the image processing unit 700 is converted into a laser modulating signal by the image signal control unit 810, and the laser modulating signal is supplied to the laser drive unit 820. And, the laser drive unit 820 drives a laser diode 831 of the image exposure unit 830 with the laser modulating signal.

In the image output unit 800, the laser beam emitting from the laser diode 831 which is modulated by the laser modulating signal from the image signal control unit 810 scans the photosensitive drum, which is omitted in FIG. 16. Thereby, a static latent image is formed on the photosensitive drum, the static latent image is developed into a toner image by the developing roller, and the toner image is transferred to the printing paper by the transfer drum, thus forming an image on the printing paper.

Figure 17:
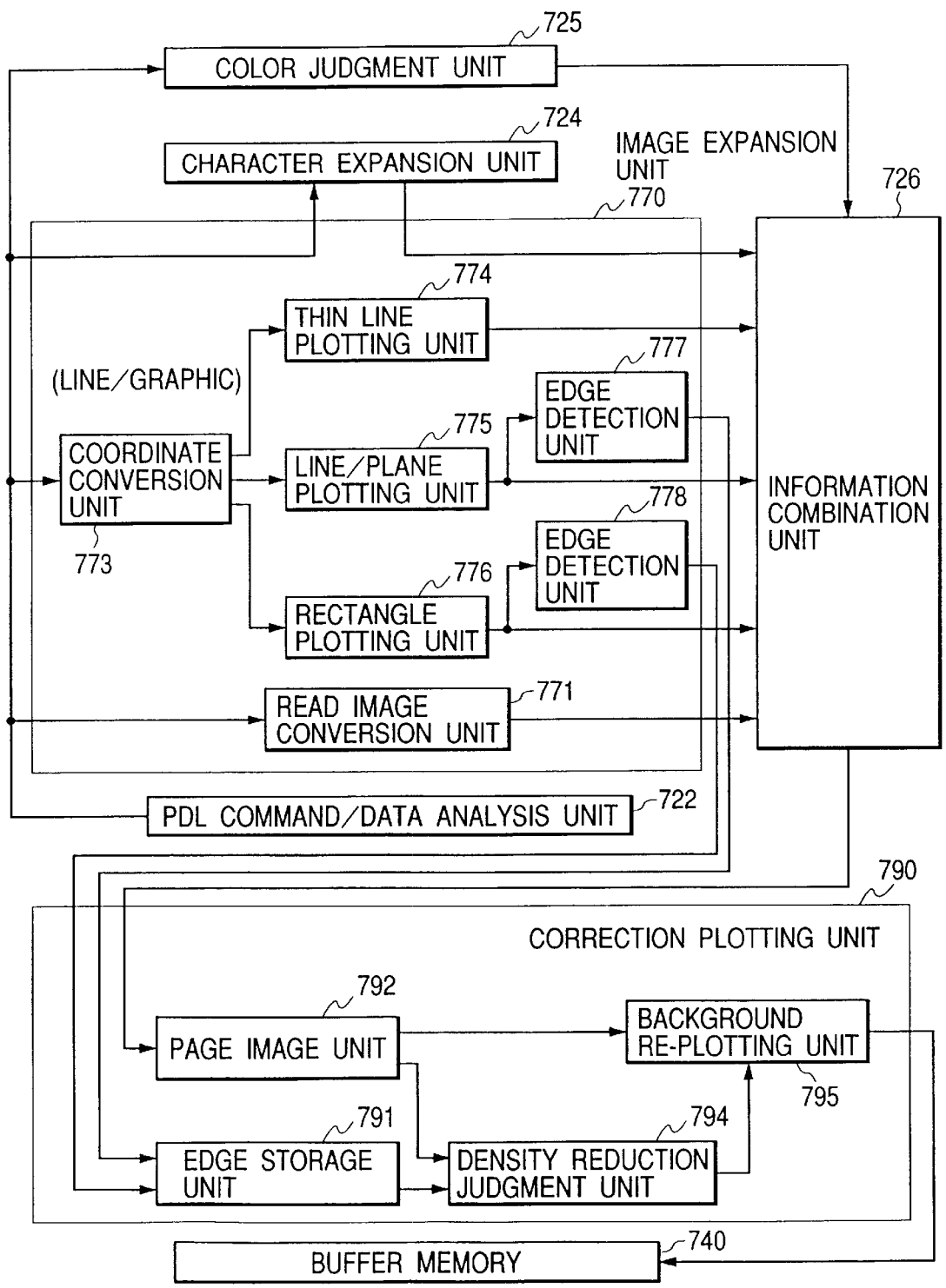
FIG. 17 is a chart to illustrate a first example of the major parts of the main control unit relating to the image processing unit in FIG. 15.

FIG. 17 illustrates an example of the major parts of the image expansion unit 770 and the correction plotting unit 790, etc., contained in the main control unit 720. The image expansion unit 770 expands the code data from the PDL command/data analysis unit 722 into the image data by each of three image objects, namely, the character, line/graphic, and read image, and executes the plotting.

The character information is sent to the character expansion unit 724, wherein it is expanded into the font, and thereby the bit map data of the characters are generated to be passed to the information combination unit 726. As to the read image information, the image conversion processing such as the resolution conversion, and the like are conducted by a read image conversion unit 771, and thereafter passed to the information combination unit 726.

The line/graphic information is subdivided into the thin line, line/plane, and rectangle by a coordinate conversion unit 773, and plotted in each of the thin line, line/plane, and rectangle as an image described in the PDL. That is, the part of the thin line is plotted by a thin line plotting unit 774, and passed to the information combination unit 726; the part of the line/plane is plotted by a line/plane plotting unit 775, and passed to the information combination unit 726; and the part of the rectangle is plotted by a rectangle plotting unit 776, and passed to the information combination unit 726.

Further, the output of the line/plane plotting unit 775 is supplied to an edge detection unit 777, and the backward edge of the line/plane image in the sub-scanning direction is detected by the edge detection unit 777. And also, the output of the rectangle plotting unit 776 is supplied to an edge detection unit 778, and the backward edge of the rectangular image in the sub-scanning direction is detected by the edge detection unit 778.

The information combination unit 726 configures an image for one page, by superposing the images by each of the image objects, and it executes the color conversion processing, etc., by each of the image objects in accordance with the information supplied from the color judgment unit 725.

The correction plotting unit 790 is comprised of an edge storage unit 791, page image unit 792, density reduction judgment unit 794, and background re-plotting unit 795.

The edge storage unit 791 stores the backward edge information from the edge detection units 777 and 778 as an edge list. The page image unit 792 acquires a synthesized page image from the information combination unit 726, and it is transferred to the density reduction judgment unit 794 and background re-plotting unit 795.

When the page image is transferred from the page image unit 792, the density reduction judgment unit 794 judges an edge where the image data varies from the halftone area to the background area in the sub-scanning direction, on the basis of the edge information contained in the edge list stored in the edge storage unit 791 and the image data on the page image, and it sends out the judgment result to the background re-plotting unit 795.

Receiving the judgment result from the density reduction judgment unit 794, the background re-plotting unit 795 re-plots the image data close to the objective edge in the background area of the page image transferred from the page image unit 792, with the image data in a non-recurrence area, and transfers the page image after re-plotted to the buffer memory 740.

In the re-plotted image, in the same manner as in the Embodiment 1, 2, or 3, the image data of the background area having m pixels at the back of the edge in the sub-scanning direction, or of the background area having m pixels at the back of the edge in the sub-scanning direction and n pixels in the main scanning direction, or of the background area having, with the edge on the center, m pixels in the sub-scanning direction and n pixels in the main scanning direction is replaced by the image data value Dc in the non-recurrence area.

Therefore, in this example, the density reduction of the line/plane and rectangular images in the rear end area in the sub-scanning direction can be prevented.

In the foregoing example, the functions of the correction plotting unit 790 are implemented through the software, but the correction plotting unit 790 may be configured with the hardware having the equivalent functions for a higher speed operation.

According to this example, in the image processing device that expands the image data from the PDL, or in the image formation device provided with the above image processing device as the image processing unit, the present invention makes it possible to prevent the density reduction in the rear end area of the halftone area which borders on the background area, when the outputted image varies from the halftone area to the background area in the sub-scanning direction, by simplified and small-scale processing without inviting the size expansion and cost increase of the image output device or image output unit. Further, since the prevention of the density reduction is possible even in case of increasing the screen line number for a higher resolution of the output images, the invention easily achieves to enhance the resolution of the output images.

According to this example, the density reduction can reliably be prevented, specially in the graphic images made by a client device which are likely to create the density reduction.

[Embodiment 7: FIG. 14 through FIG. 16, FIG. 18]

Figure 18:
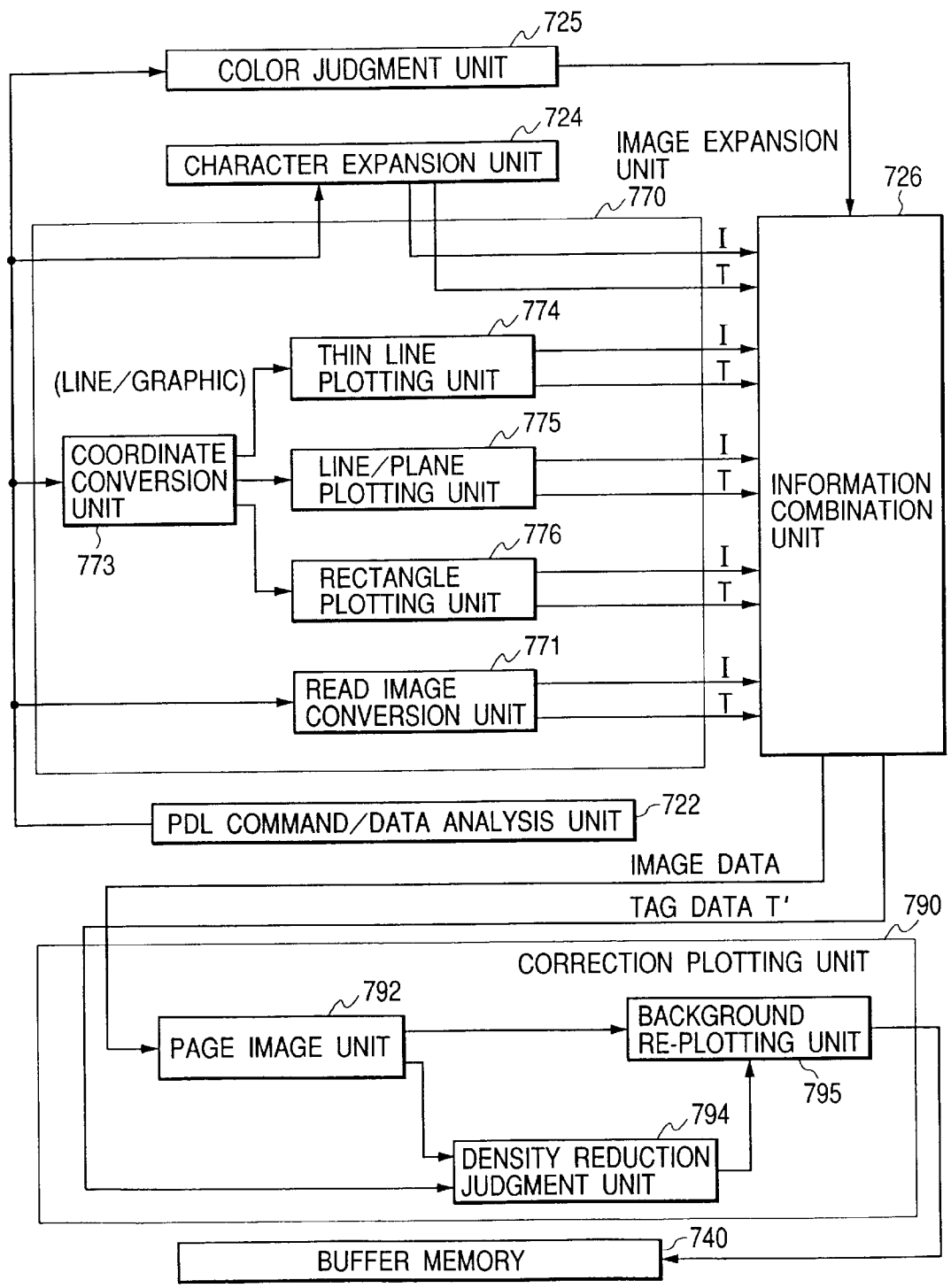
FIG. 18 is a chart to illustrate a second example of the major parts of the main control unit relating to the image processing unit in FIG. 15.

FIG. 18 illustrates another example of the major parts of the main control unit 720 of the image processing unit 700 shown in FIG. 14 and FIG. 15.

In this example, the PDL command/data inputted to the PDL command/data analysis unit 722 through the communication control unit 710 and communication protocol analysis control unit 721 is analyzed in terms of the identity of image information by the PDL command/data analysis unit 722, and the result is passed to the image expansion unit 770.

The image expansion unit 770 incorporates outline information from the character expansion unit 724, and if the identity thereof is the character information, expands the image data of the character, and outputs image data I thereof and tag data T having information indicating the character to the information combination unit 726.

If it is the line/graphic information, the coordinate conversion unit 773 subdivides the information into the thin line, line/plane, and rectangle. The image data of the thin line, line/plane, and rectangle are expanded in the thin line plotting unit 774, line/plane plotting unit 775, and rectangle plotting unit 776. The image data I thereof and the tag data T including the identity information of the line/graphic and the overlapping information are outputted to the information combination unit 726.

If it is the read image information, the conversion unit 771 expands the image information in conformity with the image output unit 800, and outputs the image data I thereof and the tag data T including the information indicating the read image to the information combination unit 726.

On the basis of the page layout information, each tag data T, and parameters from the color judgment unit 725, the information combination unit 726 synthesizes each image data I, and generates the image data of each color of YMCK. Also, it regenerates a tag data T' that includes each identity of plotting elements and the overlapping information from each of the tag data, and passes the tag data T' together with the image data to the correction plotting unit 790.

The correction plotting unit 790 is configured with the page image unit 792, density reduction judgment unit 794, and background re-plotting unit 795; and the page image unit 792 acquires the page image synthesized by the information combination unit 726, and transfers it to the density reduction judgment unit 794 and background re-plotting unit 795.

The density reduction judgment unit 794 judges, on the basis of the tag data T' from the information combination unit 726 and the image data from the page image unit 792, the edge whose image data vary from the halftone area to the background area, and sends out the judgment result to the background re-plotting unit 795. In this case, observing the tag data T' in the sub-scanning direction, the density reduction judgment unit 794 judges whether or not the edge is the objective one, from the image data before and after the position where the tag data T' varies.

Receiving the judgment result form the density reduction judgment unit 794, in the same manner as in the example in FIG. 17, the background re-plotting unit 795 re-plots the image data in the background area close to the objective edge of the page image transferred from the page image unit 792 with the image data in the non-recurrence area, and transfers the page image after re-plotted to the buffer memory 740.

[Embodiment 8: FIG. 14 through FIG. 16, FIG. 19, FIG. 20]

Figure 19:
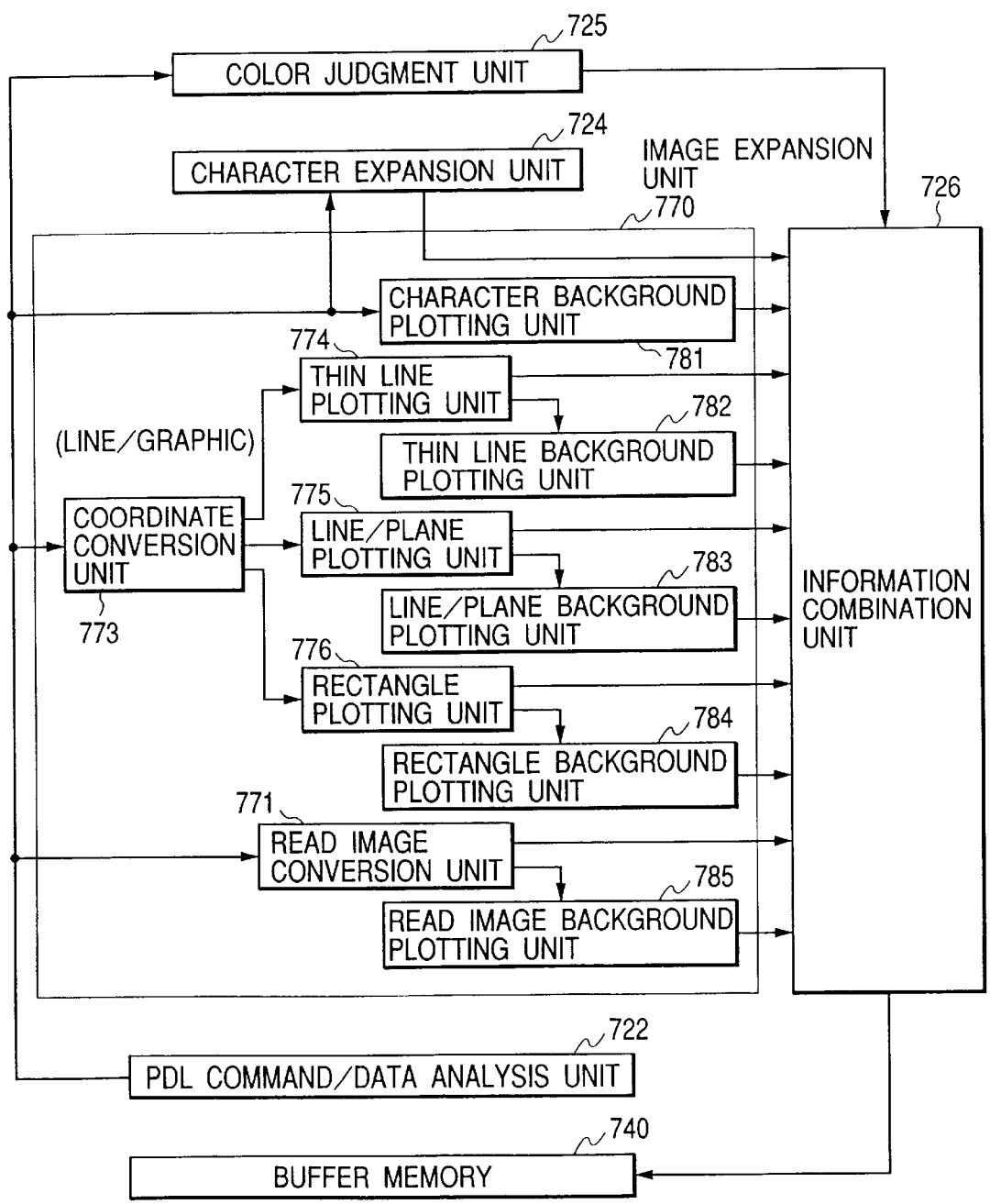
FIG. 19 is a chart to illustrate a third example of the major parts of the main control unit relating to the image processing unit in FIG. 15.
Figure 20:
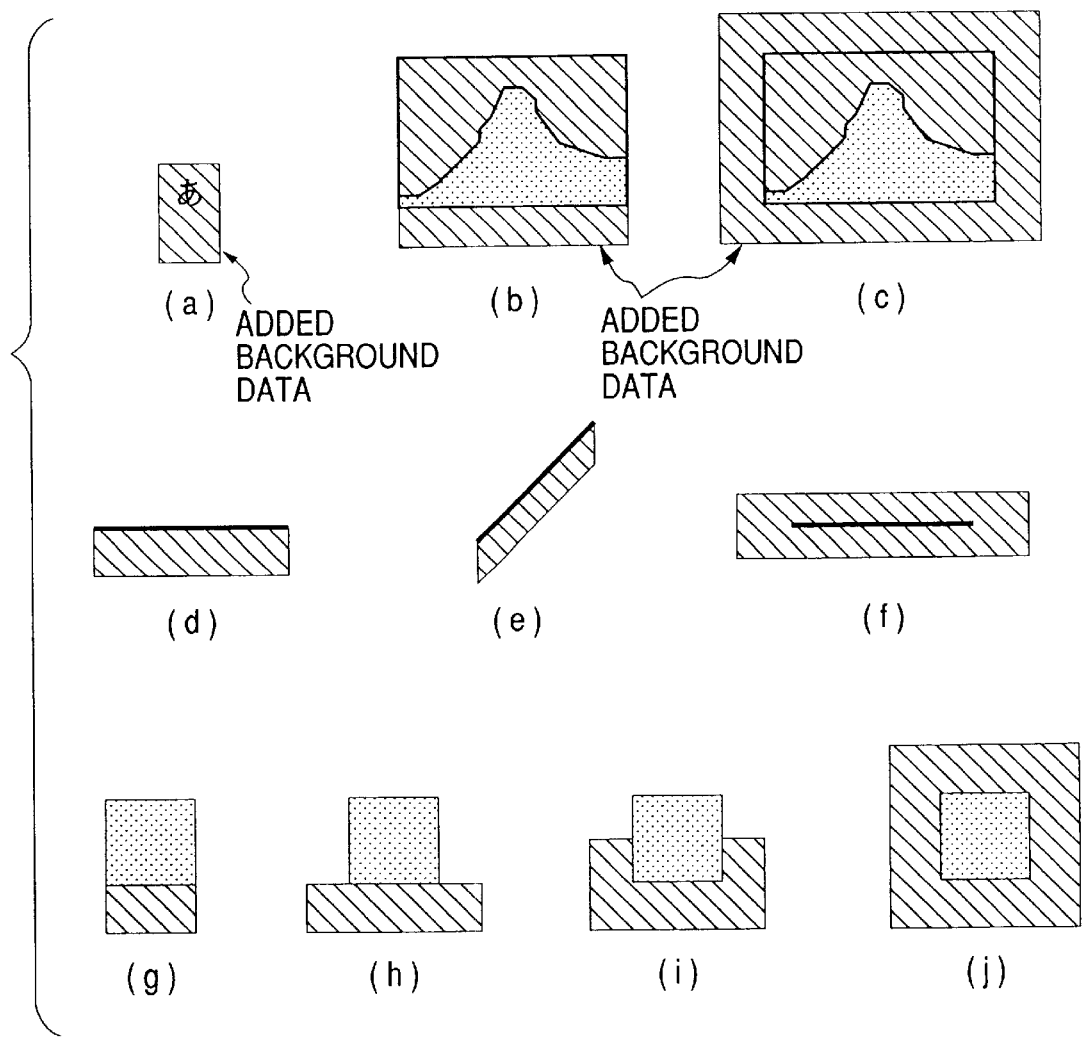
FIG. 20 is a chart to illustrate areas of the background correction image in the example of FIG. 19.

FIG. 19 illustrates another example of the major parts of the main control unit 720 of the image processing unit 700 shown in FIG. 14 and FIG. 15. In this example, the image expansion unit 770 has the function to re-plot the background image data included therein.

The image expansion unit 770 expands the code data from the PDL command/data analysis unit 722 into the image data of each of the three image objects, namely, the character, line/graphic, and read image, and plots them.

That is, the character information is sent to the character expansion unit 724, where it is expanded into the font and the bit map data of the character are generated, which are passed to the information combination unit 726. At the same time, a character background plotting unit 781 generates the background image data of the character from the information of the character size and its position, adds the information indicating a background correction image to the data, and passes the result to the information combination unit 726. As shown by an added background data in FIG. 20*a*, the character background image data is defined as the image data in the backward area of a rectangular area in which the character is arranged in the sub-scanning direction.

The image conversion processing such as the resolution conversion, etc., is conducted in the read image conversion unit 771, which is passed to the information combination unit 726. At the same time, the background image data are generated after the image conversion in an area having the read image area enlarged by a read image background plotting unit 785, as shown by the added background data in FIG. 20*b* and FIG. 20*c*. The information indicating the background correction image is added to the background image, which is passed to the information combination unit 726.

The line/graphic information is subdivided into the thin line, line/plane, and rectangle by the coordinate conversion unit 773, each of which is plotted in each of the thin line, line/plane, and rectangle as an image described in the PLD.

That is, the part of the thin line is plotted by the thin line plotting unit 774, and passed to the information combination unit 726; the part of the line/plane is plotted by the line/plane plotting unit 775, and passed to the information combination unit 726; and the part of the rectangle is plotted by the rectangle plotting unit 776, and passed to the information combination unit 726.

The thin line background plotting unit 782 generates the background image data of an area having the thin line image area enlarged, as shown in FIG. 20*d*, FIG. 20*e*, and FIG. 20*f*; the line/plane background plotting unit 783 generates the background image data of an area having the line/plane image area enlarged, as shown in FIG. 20*d* through FIG. 20*j*; and the rectangle background plotting unit 784 generates the background image data of an area having the rectangle image area enlarged, as shown in FIG. 20*g* through FIG. 20*j*. Each of these units adds the information indicating the background correction image to each of the background image data, and passes it to the information combination unit 726.

The information combination unit 726 superposes the images of each image objects to compose a picture image for one page, and executes the color conversion, etc., to each objects on the basis of the information acquired from the color judgment unit 725. While the images are superposed by the information combination unit 726, the background image data from the character background plotting unit 781, from the thin line background plotting unit 782, from the line/plane background plotting unit 783, from the rectangle background plotting unit 784, and from the read image background plotting unit 785 each are located in the lowest layer. Further, the value of the background image data in each color of YMCK corresponding to these images is specified as the setting value Dc associated with the recurrence start point.

According to this example, in the same manner as in the Embodiment 6 and 7, the present invention makes it possible to prevent the density reduction in the rear end area of the halftone area which borders on the background area, when the outputted image varies from the halftone area to the background area in the sub-scanning direction, by a simplified and small-scale processing without inviting the size expansion and cost increase of the image output device or image output unit, and also the invention easily achieves to enhance the resolution of the output images.

Specially in this example, the image data for background correction are generated for each of the plotting elements, which are superposed on the normal image data, and thereby the final image data are generated. Accordingly, it is impossible to create a chance that adds a correction image to an unnecessary position. It is not necessary to perform the judgment as to the creation of TED from the image data after superposition, and not necessary either to set the correction area again depending on the judgment result. Since the normal plotting processing can also be utilized as it is in the generation of each background correction images, the processing can be reduced to a great extent.

According to the present invention thus described, it is possible to prevent the density reduction in the rear end area of the halftone area which borders on the background area, when the outputted image varies from the halftone area to the background area in the sub-scanning direction, by a simplified and small-scale processing without inviting the size expansion and cost increase of the image formation device or the image output device. Further, since the prevention of the density reduction is possible even in case of increasing the screen line number for a higher resolution of the output images, the resolution enhancement of the output images can easily achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image formation device that forms a color image on a recording medium, comprising:
    an edge extraction part that extracts an edge in which multivalued image data of each recorded color varies from halftone image data to background image data in the sub-scanning direction said the recording medium; and
    an image data correction part that modifies a value of the background image data close to the edge extracted by said edge extraction part, of the multivalued image data, to a setting value close to an image recurrence start point of said image formation device.

2. An image formation device as claimed in claim 1, wherein said setting value can be designated by a user.

3. The image formation device as claimed in claim 2, further comprising:
    a part that outputs sample images for specifying said setting value; and
    a part that specifies said setting value with numbers applied to the outputted sample images.

4. An image formation device that forms a color image on a recording medium, comprising:
    a gradation correction part that executes gradation conversion of the multivalued image data of each recorded color;
    an edge extraction part that extracts an edge in which multivalued image data after the gradation conversion varies from halftone image data to background image data in the sub-scanning direction on said recording medium; and
    an image data correction part that modifies a value of the background image data close to the edge extracted by said edge extraction part, of the multivalued image data after the gradation conversion, to a setting value close to an image recurrence start point of said image formation device.

5. An image formation device that forms a color image on a recording medium, comprising:
    an edge extraction part that extracts an edge in which multivalued image data of each recorded color varies from halftone image data to background image data in the sub-scanning direction on said recording medium;
    a gradation correction part that executes gradation conversion of said multivalued image data; and
    an image data correction part that modifies a value of the background image data close to the edge extracted by said edge extraction part, of the multivalued image data after the gradation conversion, to a setting value close to an image recurrence start point of said image formation device.

6. An image formation device that forms a color image on a recording medium, comprising:
    an edge extraction part that extracts an edge in which multivalued image data of each recorded color varies from halftone image data to background image data in the sub-scanning direction on said recording medium;
    an image data correction part that modifies a value of the background image data close to the edge extracted by said edge extraction part, of the multivalued image data, to a specific value; and
    a gradation correction part that executes gradation conversion of the multivalued image data after the modification so as to use an output value as a setting value close to an image recurrence start point of said image formation device, when an input value is the specific value.

7. An image formation device that forms a color image on a recording medium, comprising:
    an image data correction part that modifies a value of background image data of multivalued image data of each recorded color to a specific value; and
    a gradation correction part that executes gradation conversion of the multivalued image data after the modification so as to use an output value as a setting value close to an image recurrence start point of said image formation device, when an input value is said specific value.

8. An image formation device that forms a color image on a recording medium, comprising:
    a gradation correction part that executes gradation conversion of multivalued image data of each recorded color, wherein, when an input value is zero, an output value is used as a setting value close to an image recurrence start point of said image formation device.

9. An image processing device that processes image information for forming an image by a unit of page, comprising:
    an image acquisition part that acquires input image data having position information for each pixel on a page and an image data value;
    an edge detection part that detects an edge in which the acquired input image data varies from halftone image data to background image data in the sub-scanning direction on said page;
    a density reduction judgment part that judges whether or not density reduction is created on the basis of the input image data before and after the detected edge; and
    a background re-plotting part that modifies, on the basis of a judgment result thereof, a value of the background image data of the input image data close to the edge detected by said edge detection part to a setting value close to an image recurrence start point of an image output device that forms the image with the image data from said image processing device.

10. The image processing device as claimed in claim 9, wherein said setting value can be designated by a user.

11. The image processing device as claimed in claim 10, including a part that outputs sample images for specifying said setting value, and a part that specifies said setting value with numbers applied to the outputted sample images.

12. An image processing device that processes image information for forming an image by a unit of page, comprising:

an interpretation & decomposition part that interprets page description languages with the image information included to decompose them into plural types of images such as a character, graphic, and read image;

an image expansion part that expands each of decomposed images into raster information;

an edge detection part, incorporated in said image expansion part, that detects an edge in which each of the expanded images varies from halftone image data to background image data in the sub-scanning direction on the page;

an information combination part that synthesizes each of said expanded images; and a background re-plotting part that modifies a value of the background image data close to the edge detected by said edge detection part, of the image data after synthesis, to a setting value close to an image recurrence start point of an image output device that forms the image with the image data from said image processing device.

13. An image processing device that processes image information for forming an image by a unit of page, comprising:

an interpretation & decomposition part that interprets page description languages with the image information included to decompose them into plural types of images such as a character, graphic, and read image;

an image expansion part that expands each of decomposed images into raster information;

an edge judgment part that judges an edge in which each of the expanded images varies from halftone image data to background image data in the sub-scanning direction on the page;

an information combination part that synthesizes each of said expanded images; and a background re-plotting part that modifies a value of the background image data close to the edge judged by said edge judgment part, of the image data after synthesis, to a setting value close to an image recurrence start point of an image output device that forms the image with the image data from said image processing device.

14. An image processing device that processes image information for forming an image by a unit of page, comprising:

an interpretation & decomposition part that interprets page description languages with the image information included to decompose them into plural types of images such as a character, graphic, and read image;

an image expansion part that expands each of decomposed images into raster information;

an edge judgment part that judges an edge in which each of the expanded images varies from halftone image data to background image data in the sub-scanning direction on the page;

an information combination part that synthesizes each of said expanded images; and a background re-plotting part that modifies a value of the background image data close to the edge judged by said edge judgment part, of the image data after synthesis, to a specific value; and a gradation correction part that executes gradation conversion of the image data after the modification so as to use an output value as a setting value close to an image recurrence start point of an image output device that forms the image with the image data from said image processing device, when an input value is said specific value.

15. An image processing device that processes image information for forming an image by a unit of page, comprising:

an interpretation & decomposition part that interprets page description languages with the image information included to decompose them into plural types of images such as a character, graphic, and read image;

an image expansion part that expands each of decomposed images into raster information;

an edge judgment part that judges an edge in which each of the expanded images varies from halftone image data to background image data in the sub-scanning direction on the page;

an information combination part that synthesizes each of said expanded images;

a gradation correction part that executes gradation conversion of the image data after synthesis; and a background re-plotting part that modifies a value of the background image data close to the edge judged by said edge judgment part, of the image data after the gradation conversion, to a setting value close to an image recurrence start point of an image output device that forms the image with the image data from said image processing device.

16. An image processing device that processes image information for forming an image by a unit of page, comprising:

an interpretation & decomposition part that interprets page description languages with the image information included to decompose them into plural types of images such as a character, graphic, and read image;

an image expansion part that expands each of decomposed images into raster information, and outputs the attribute of each of expanded images;

an information combination part that synthesizes each of the expanded images and the attribute thereof to output synthesized image data and image attribute information;

a density reduction judgment part that judges, on the basis of the synthesized image data and the image attribute information, an edge in which the synthesized image data varies from halftone image data to background image data in the sub-scanning direction on the page; and a background re-plotting part that modifies a value of the background image data close to the edge judged by said density reduction judgment part, of said synthesized image data, to a setting value close to an image recurrence start point of an image output device that forms the image with the image data from said image processing device.

17. An image processing device that processes image information for forming an image by a unit of page, comprising:

an interpretation & decomposition part that interprets page description languages with the image information included to decompose them into plural types of images such as a character, graphic, and read image, an image expansion part that expands each of decomposed images into raster information; and an information combination part that synthesizes each of expanded images, wherein said image expansion part generates a background correction image in correspondence with each of the expanded images, and outputs it to said information combination part together with identification information indicating the background correction image, and said information combination part locates said background correction image in the lowest layer, using a value of the image data as a setting value close to an image recurrence start point of an image output device that forms the image with the image data from said image processing device.

18. An image processing device that processes image information for forming an image by a unit of page, comprising:

an interpretation & decomposition part that interprets page description languages with the image information included to decompose them into plural types of images such as a character, graphic, and read image;

an image expansion part that expands each of decomposed images into raster information;

an information combination part that synthesizes each of expanded images; and an image data correction part that modifies a value of the background image data of the image data after synthesis, to a setting value close to an image recurrence start point of an image output device that forms the image with the image data from said image processing device.

* * * * *